(12) United States Patent
Roman Negron et al.

(10) Patent No.: US 11,092,196 B2
(45) Date of Patent: Aug. 17, 2021

(54) BEARINGS WITH ANTI-FRICTION SEPARATORS

(71) Applicants: Alberto Jose Roman Negron, Orlando, FL (US); Alberto C. Roman Briceno, Orlando, FL (US)

(72) Inventors: Alberto Jose Roman Negron, Orlando, FL (US); Alberto C. Roman Briceno, Orlando, FL (US)

(*) Notice: Subject to any disclaimer, the term of this patent is extended or adjusted under 35 U.S.C. 154(b) by 0 days.

(21) Appl. No.: 16/853,668

(22) Filed: Apr. 20, 2020

(65) Prior Publication Data

US 2020/0248748 A1 Aug. 6, 2020

Related U.S. Application Data

(63) Continuation-in-part of application No. 16/200,534, filed on Nov. 26, 2018, now Pat. No. 10,626,920.

(51) Int. Cl.
| | |
|---|---|
| *F16C 19/06* | (2006.01) |
| *F16C 19/20* | (2006.01) |
| *F16C 33/37* | (2006.01) |
| *F16C 33/38* | (2006.01) |
| *F16C 33/58* | (2006.01) |
| *F16C 33/60* | (2006.01) |
| *F16C 19/26* | (2006.01) |

(52) U.S. Cl.
CPC .......... *F16C 33/3713* (2013.01); *F16C 19/06* (2013.01); *F16C 19/20* (2013.01); *F16C 19/26* (2013.01); *F16C 33/3706* (2013.01); *F16C 33/3893* (2013.01); *F16C 33/585* (2013.01); *F16C 33/605* (2013.01)

(58) Field of Classification Search
CPC .......... F16C 19/06; F16C 19/08; F16C 19/20; F16C 19/28; F16C 33/3706; F16C 33/3713; F16C 33/3893; F16C 33/585; F16C 33/605; F16C 19/26
USPC ........ 384/504, 513, 522, 551, 553, 565, 571
See application file for complete search history.

(56) References Cited

U.S. PATENT DOCUMENTS

| | | | | |
|---|---|---|---|---|
| 638,863 | A * | 12/1899 | Chatham ................. | F16C 19/40 384/553 |
| 852,462 | A * | 5/1907 | Seubert ................... | F16C 19/18 384/522 |
| 951,847 | A * | 3/1910 | Seubert ............... | F16C 33/3713 384/522 |

(Continued)

FOREIGN PATENT DOCUMENTS

DE 102017217810 A1 * 4/2019 ............. F16C 33/50

*Primary Examiner* — Marcus Charles
(74) *Attorney, Agent, or Firm* — Franco S. De Liguori; DP IP Group

(57) ABSTRACT

An anti-friction radial bearing has an inner track, an outer track, a pair of extension members, load-carrying rolling members, and double coaxial, cylindrical individual spacers. Each of the extension members has an internal cylindrical hoop surface and is securely mounted to at least one of the inner and outer tracks. The rolling members are equidistantly spaced and rotatably engageable with the inner and outer tracks. The spacers are disposed in pure rolling contact at their ends with the internal cylindrical hoop surfaces of the extension members. Each of the spacers is positioned in pure rolling contact between a corresponding adjacent pair of the rolling members.

16 Claims, 22 Drawing Sheets

(56) References Cited

U.S. PATENT DOCUMENTS

| | | | | | |
|---|---|---|---|---|---|
| 1,282,888 | A | * | 10/1918 | Lippincott | F16C 33/605 |
| | | | | | 384/522 |
| 1,287,225 | A | * | 12/1918 | Cheney | F16C 33/605 |
| | | | | | 384/522 |
| 1,494,638 | A | * | 5/1924 | Sheldon | F16C 43/06 |
| | | | | | 384/553 |
| 1,507,586 | A | * | 9/1924 | Cooper | F16C 33/3862 |
| | | | | | 384/513 |
| 2,120,533 | A | * | 6/1938 | Tillson | F16C 33/3713 |
| | | | | | 29/898.09 |
| 3,124,396 | A | * | 3/1964 | Barger | F16C 33/3713 |
| | | | | | 384/522 |
| 3,790,239 | A | * | 2/1974 | Laux | F16C 33/6696 |
| | | | | | 384/463 |
| 3,843,217 | A | * | 10/1974 | Henning | F16C 33/3706 |
| | | | | | 384/447 |
| 4,080,018 | A | * | 3/1978 | Traut | F16C 19/50 |
| | | | | | 384/522 |
| 4,174,141 | A | * | 11/1979 | Reiss | F16C 19/40 |
| | | | | | 384/554 |
| 4,795,279 | A | * | 1/1989 | Smith | F16C 33/3713 |
| | | | | | 384/450 |
| 4,799,809 | A | * | 1/1989 | Kuroiwa | F16C 19/20 |
| | | | | | 384/475 |
| 4,859,090 | A | * | 8/1989 | Smith | F16C 19/16 |
| | | | | | 384/463 |

\* cited by examiner

BEARINGS WITH ANTI-FRICTION SEPARATORS

CROSS-REFERENCE TO RELATED APPLICATION

This application is a continuation-in-part of and claims the benefit of priority to U.S. patent application Ser. No. 16/200,534, filed Nov. 26, 2018, now U.S. Pat. No. 10,626,920, issued Apr. 21, 2020.

BACKGROUND OF THE DISCLOSURE

Field of the Disclosure

The present disclosure relates generally to anti-friction bearings and, more specifically, to angular contact, purely axial, and radial bearings with anti-friction spacers or separators such that all bearing components move with pure rolling contact, i.e., without sliding contact among the bearing integral parts.

Background Information

Angular contact and purely axial bearings are generally formed of two rings or tracks, a predetermined number of rolling elements (e.g., balls or rollers) placed between these tracks, and a single retainer or cage which maintains the rolling elements around the periphery of the tracks equidistantly separated, thus avoiding the high degree of friction that would be generated if those elements would touch each other. The difference between these two types of bearings is that while angular contact bearings can bear radial and axial loads at the same time, the latter in one direction only, purely axial bearings can only support an axial load in one direction.

In angular contact bearings, the line of action of the force applied to the bearing is in a contact angle α with the axis of symmetry of the bearing. This means that these types of bearings are designed to accommodate combined loads, i.e., simultaneously acting radial and axial loads. When the contact angle α is equal to zero, only an axial load acts. In that case, the bearing becomes a purely axial bearing. Accordingly, a purely axial bearing is a particular case of an angular contact bearing when the contact angle α is equal to zero. For this reason, in the present disclosure the term "angular contact bearing" includes purely axial bearings.

Radial ball bearings are designed to withstand forces that are perpendicular to the direction of the shaft, or radial loads. Some ball bearings are able to withstand a radial and axial load applied on the shaft, these combined axial/radial load bearings are achieved by axial angular contact. The angle of these axial radial bearings allows the axial load and the radial load to be distributed more evenly along the axial angular contact ball bearing.

FIGS. 1(a)-1(b) show conventional angular contact bearings of the ball (FIG. 1(a)) and roller (FIG. 1(b)) type. The conventional angular contact bearings include an inner track IT, an outer track OT, balls or rollers B or R, and a cage C. In both of these types of conventional bearings, the contact among the rolling elements B or R and cages C occurs with a high degree of sliding, resulting in friction and wear. As a result, the cage breaks more frequently than the other components of the bearing. When the cage breaks, the bearing is blocked. In some cases, the breaking of the cages is due to fatigue or by high pressure exerted on them by the rolling elements due to centrifugal forces whose magnitudes are directly proportional to the angular velocity of the bearing. Sometimes, to obtain a better support, the cages additionally contact a track with a high level of sliding which provides an additional source of friction and wear. The friction and wear usually determine the lower limit of the length of service of the bearings and, at the same time, shortens the fatigue functioning time.

The foregoing inconvenience inspired the idea of using another type of spacers or separators to eliminate the sliding contact among the rolling elements and the conventional cage. There is known a solution to the problem stated before, but only for bearings of the radial type, which are bearings that can bear loads in the radial direction only. FIGS. 2(a)-2(b) show an example of a ball bearing of this type disclosed in British Patent No. 122,178 to Ivan August Mauritz Larsson ("Larsson"). The ball bearing disclosed by Larsson is formed of an outer ring 1, inner ring 2, rolling elements (balls) 3 and individual separators 4 guided by means of annular bearing surfaces 6 on plates 5 which are fixed upon the inner ring 2 or removably connected therewith. In the Larsson ball bearing, rolling elements 3 and separators 4 have a motion in the plane compounded by a spin around its axis of symmetry and a precession around the center of the bearing, similar to motion of the planets around the sun. For this reason, separators 4 have the shape of two cylinders with the same axis of symmetry.

In view of the foregoing, there is a need for bearings with anti-friction separators which overcome the foregoing drawbacks of the conventional art.

SUMMARY OF THE DISCLOSURE

It is an object of the present disclosure to provide bearings with anti-friction separators such that all bearing parts move with pure rolling contact, i.e., without sliding contact among the bearing components.

Another object of the present disclosure is to provide anti-friction separators which substantially improve the performance of bearings and reduce the chances of failure. This is achieved by bearings equipped with the anti-friction separators of the present disclosure which effectively eliminate friction and wear caused by conventional cages, obtain greater wear and fatigue functioning times, increase the operating speed ranges, boost the time and speed of operation, and increase capacities of static and dynamic load by occupying less space which makes it possible to arrange a larger number of rolling elements in the bearings and, therefore, raise the load capacities of the bearings.

Another object of the present disclosure is to provide bearings with anti-friction separators, which are economical and easy to manufacture and assemble.

A feature of the present disclosure relates to the replacement of the separating cage in conventional bearings with the individual separators according to the present disclosure. Each of the separators is placed between two contiguous rolling elements (e.g., balls, rollers, or kegs/barrels) that it separates and in contact with two extensions of anyone of two tracks. By this arrangement, pure rolling contact among all of the bearing components is ensured.

According to the present disclosure, the separators and the two extensions of anyone of the tracks do not support a load and have simple configurations which makes them easy to manufacture in series using any solid material such as, but not limited to, aluminum, plastics, polyamide, ceramic, and fiberglass. The material selected for the separators of the present disclosure is not required to have a high resistance.

The foregoing and other objects and features of the present disclosure are achieved, in a first aspect, by an anti-friction bearing comprising a pair of rotatable tracks, a pair of extension members removable securely mounted to one of the pair of tracks, a plurality of spaced load-carrying rolling members rotatable engageable between the tracks, and a plurality of spacers disposed in contact with the pair of extension members, each of the plurality of spacers being engageable with and cooperatively separating an adjacent pair of the plurality of rolling elements without relative sliding motion therebetween.

In embodiments of the first aspect of the present disclosure, the rolling members comprise one of balls, rollers and barrels.

In another embodiment of the first aspect, each of the extension members is conical ring-shaped.

In yet another embodiment of the first aspect, the extension members are removable securely mounted to one of the pair of tracks by friction fit.

In still another embodiment of the first aspect, each of the plurality of spacers is in the shape of a double truncated cone.

In a second aspect, the present disclosure is directed to an anti-friction radial bearing comprising: an inner track; an outer track; a pair of extension members securely mounted to at least one of the inner and outer tracks, each of the extension members having an internal cylindrical hoop surface; a plurality of equidistantly spaced, load-carrying rolling members rotatably engageable with the inner and outer tracks; and a plurality of double coaxial, cylindrical individual spacers disposed in pure rolling contact at its ends with the internal cylindrical hoop surfaces of the pair of extensions members, each of the plurality of individual spacers being positioned in pure rolling contact between a corresponding adjacent pair of the plurality of rolling members.

In one embodiment of the second aspect, each of the plurality of individual spacers is configured in the form of a double cylinder with common axis of symmetry, one of the cylinders being configured for pure rolling contact in its central surface with the two adjacent rolling members that it separates, and the other cylinder being configured for contacting without sliding the two internal cylindrical hoop surfaces of both of the pair of extension members at their ends.

In another embodiment of the second aspect, the pair of extension members are securely mounted to both of the inner and outer tracks.

In another embodiment of the second aspect, the internal cylindrical hoop surface of each of the extension members of the at least one of the inner and outer tracks has a corresponding radius REIT for the inner track and REOT for the outer track and its axis of symmetry coincides with the axis of symmetry of the radial bearing. The two cylinders forming each spacer have the same axis, the one cylinder that is in pure rolling contact at its central surface with the two adjacent rolling elements that it separate has a diameter DC, and the other cylinder that is in pure rolling contact at its ends with the internal cylindrical hoop surfaces of the two extension members of the at least one of the inner and outer track has a diameter of DE. The dimensions DC, DE, REIT or REOT are interdependent with one another such that the determination of any of these dimensions determines the corresponding others of these dimensions.

In yet another embodiment of the second aspect, the internal cylindrical hoop surface of each of the extension members of the at least one of the inner and outer tracks has a radius of REIT for the inner track and REOT for the outer track and its axis of symmetry coincides with the axis of symmetry of the radial bearing. The two cylinders forming each spacer have the same axis, the one cylinder that is in pure rolling contact at its central surface with the two adjacent rolling elements that it separate has a diameter DC, and the other cylinder that is in pure rolling contact at its ends with the internal cylindrical hoop surfaces of the two extension members of the at least one of the inner and outer track has a diameter of DE. The dimensions DC and DE are defined by the mean radius RM of the radial bearing, the number NE of the rolling members, the radius of the rolling members, and one of the radii REIT and REOT of the extension members.

In still another embodiment of the second aspect, the internal cylindrical hoop surface of each of the extension members of the at least one of the inner and outer tracks has a radius of REIT for the inner track and REOT for the outer track and its axis of symmetry coincides with the axis of symmetry of the radial bearing. The two cylinders forming each spacer have the same axis, the one cylinder that is in pure rolling contact at its central surface with the two adjacent rolling elements that it separate has a diameter DC, and the other cylinder that is in pure rolling contact at its ends with the internal cylindrical hoop surfaces of the two extension members of the at least one of the inner and outer tracks has a diameter of DE. When both ends of the spacers contact without sliding the two internal cylindrical hoop surfaces of the two extensions of the inner track, the diameter of the separator ends are greater than the diameter of its central cylinder. When the two ends of the spacers contact with pure rolling contact both internal cylindrical hoop surfaces of the outer track extensions, the diameter of the spacers ends are less than the diameter of its central cylinder.

In yet another embodiment of the second aspect, the plurality of rolling members and the inner and outer tracks, the central surface of each double cylindrical spacer and the two adjacent rolling members that it separates, the end surfaces of each double cylindrical spacer, and the internal cylindrical hoop surfaces of the extension members of the at least one of the inner and outer tracks undergo only pure rolling contact, i.e., without sliding, such that there is no friction, wear and heat generation in the entire radial bearing.

In a further embodiments of the second aspect, the rolling members comprise one of balls, rollers, and keg- or barrel-shaped rolling members.

In still a further embodiment of the second aspect, the rolling members comprise one of balls and keg- or barrel-shaped rolling members; and wherein each of the plurality of spacers has a groove on its central surface so that the rolling members prevent displacement of the spacers in its axis of symmetry direction.

In yet a further embodiment of the second aspect, the rolling members comprise rollers; and wherein each of the plurality of spacers has inverted, arrowhead-shaped ends and are configured to contact the two extensions of the inner track such that the rollers prevent displacement of the spacers in their axis of symmetry direction due to the inverted, arrowhead shape of the ends of the spacers.

In another embodiment of the second aspect, the rolling members comprise one of balls, rollers, or barrels. Each of the plurality of spacers has arrowhead-shaped ends and is configured to contact the two extensions of the outer track such that the two extensions prevent the displacement of the spacers in their axis of symmetry direction due to the arrowhead shape of the spacers.

In another embodiment of the second aspect, the rolling members are arranged in multiple rows.

In still another embodiment of the second aspect, each of the extension members has the shape of a hoop with the same axis of symmetry as the axis of symmetry of the radial bearing and with an internal cylindrical surface along which cylindrical end surfaces of the spacers roll; and wherein each of the plurality of spacers has the shape of a double cylinder of different diameters and the same axis of symmetry.

In yet another embodiment of the second aspect, the extension members are removably securely mounted to one of the inner and outer tracks.

In yet a further embodiment of the second aspect, the extension members, the plurality of rolling members, and the plurality of spacers are arranged for undergoing pure rolling contact with respect to each other such that there is no sliding contact among the extension members, rolling members and plurality of spacers to avoid friction, wear and heat generation in the entire radial bearing.

The foregoing and other aspects and embodiments of the present disclosure are described in further detail below with reference to the drawings.

DESCRIPTION OF THE DRAWINGS

The following description of the embodiments of the disclosure will be better understood when read in conjunction with the accompanying drawing. For the purpose of illustrating the disclosure, there is shown in the drawings embodiments which are presently preferred. It should be understood however, that the disclosure is not limited to the precise arrangement and instrumentalities shown.

For all the graphics in this presentation: B=balls; C=cage; S=separators or spacer; EIT1=extension of inner track 1; EIT2=extension of inner track 2; EOT1=extension of outer track 1; EOT2=extension of outer track 2; IT=internal track; K=kegs or barrels; OT=outer track; R=rollers; α=contact angle; $α_p$=cone angle of the extension tracks which make contact with the separators; $α_q$=cone angle of separator which makes contact with the extensions of the tracks; $α_s$=cone angle of separator which makes contact with the rolling elements; DC=diameter of the central cylinder of the separator; DE=diameter of the cylinder at the two ends of the separator; RM=the mean radius of the bearing; RB=radius of the balls; RR=radius of the rollers; RK=radius of the kegs or barrels at its central part; REIT=radius of the internal cylindrical hoop surface of the two inner track extensions where both ends of the separators roll; and REOT=radius of the internal cylindrical hoop surface of the two outer track extensions where the two ends of the spacers roll.

FIG. 14(a) is a fragmentary radial view in partial cross-section of the upper part of the radial bearing, FIG. 14(b) is a cross-sectional view taken along the line 14(b)-14(b) in FIG. 14(a), and FIG. 14(c) shows the separator used in this embodiment.

FIG. 15(a) is a fragmentary radial view in partial cross-section of the upper part of the radial bearing, FIG. 15(b) is a cross-sectional view taken along the line 15(b)-15(b) in FIG. 15(a), and FIG. 15(c) shows the separator used in this embodiment.

FIG. 16(a) is a fragmentary radial view in partial cross-section of the upper part of the radial bearing, FIG. 16(b) is a cross-sectional view taken along the line 16(b)-16(h) in FIG. 16(a), and FIG. 16(c) shows the separator used in this embodiment.

FIG. 17(a) is a fragmentary radial view in partial cross-section of the upper part of the radial bearing, FIG. 17(b) is a cross-sectional view taken along the line 17(b)-17(b) in FIG. 17(a), and FIG. 17(c) shows the separator used in this embodiment.

FIG. 18(a) is fragmentary radial view in partial cross-section of the upper part of the radial bearing, FIG. 18(b) is a cross-sectional view taken along the line 18(b)-18(b) in FIG. 18(a), and FIG. 18(c) shows the separator used in this embodiment.

FIG. 19(a) is a fragmentary radial view in partial cross-section of the upper part of the radial bearing, FIG. 19(b) is a cross-sectional view taken along the line 19(b)-19(b) in FIG. 19(a), and FIG. 19(c) shows the separator used in this embodiment.

FIG. 20(a) is a fragmentary radial view in partial cross-section of the upper part of the radial bearing, FIG. 20(b) is a cross-sectional view taken along the line 20(b)-20(b) in FIG. 20(a), and FIG. 20(c) shows the separator used in this embodiment.

FIG. 21(a) is a fragmentary radial view in partial cross-section of the upper part of the radial bearing, FIG. 21(b) is a cross-sectional view taken along the line 21(b)-21(b) in FIG. 21(a), and FIG. 21(c) shows the separator used in this embodiment.

The embodiments in FIGS. 5(a)-5(c), 6(a)-6(c), 7(a)-7(c), 8(a)-8(c). 9(a)-9(c), 10(a)-10(c), and 11(a)-11(c) illustrate the following components of the angular contact bearings: The inner track IT, the outer track OT, the rolling elements, balls B or rollers R or kegs or barrels K, placed equidistantly separated between the two tracks IT and OT; the anti-friction separators S placed between the pair of rolling elements that they separate and the two extensions of the track EIT1 and EIT2 or EOT1 and EOT2.

Figure 10:
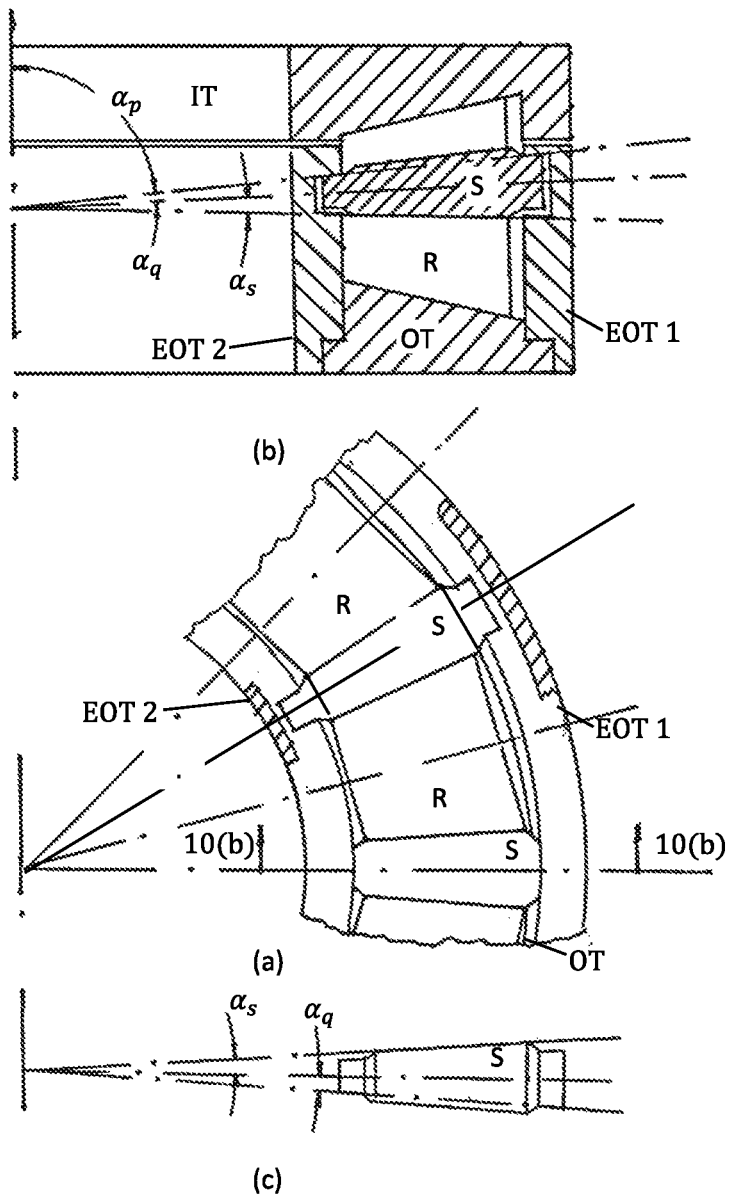
Figure 11:
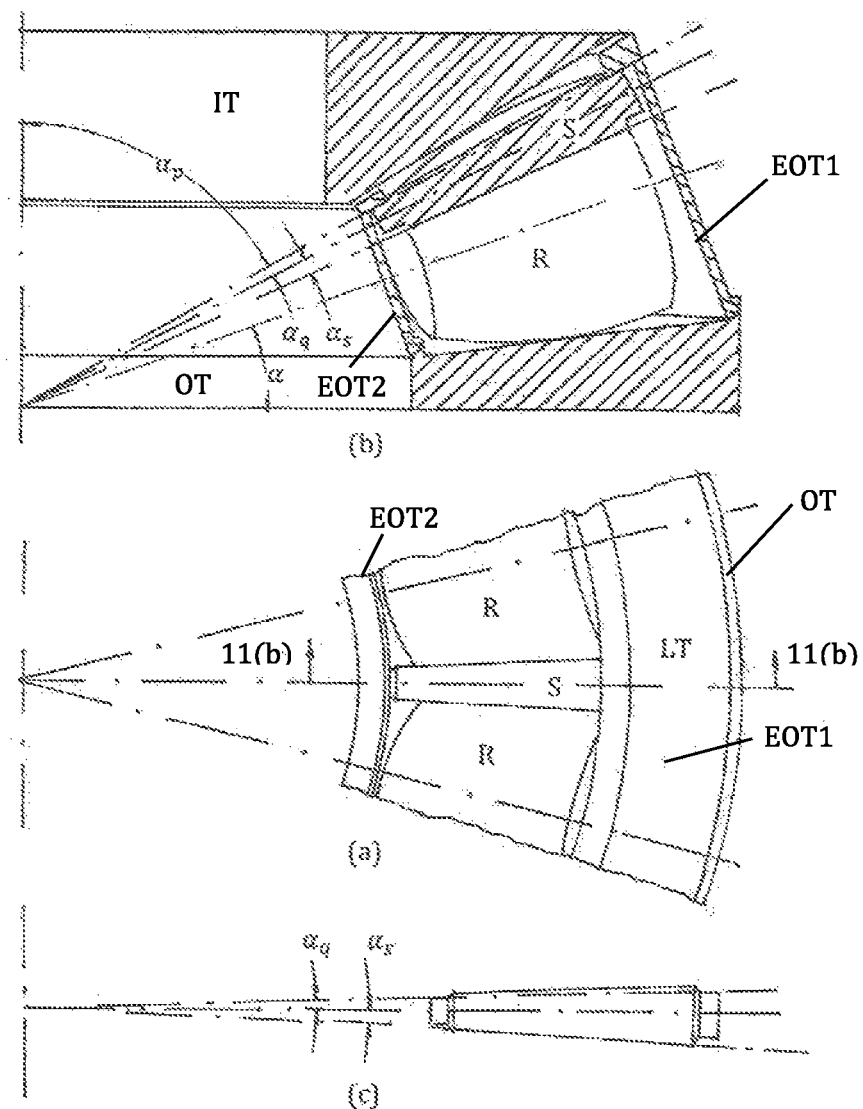
FIGS. 11(a)-11(c) show a case when the rolling elements are kegs or barrels where the separators according to this disclosure can also be used.

FIGS. 5(a), 6(a), 7(a), 8(a), 9(a). 10(a) and 11(a) are fragmentary axial views with the track without extensions removed. FIGS. 5(b)-11(b) show the two tracks, IT and OT, in position, where. FIG. 5(b) is a cross-sectional view taken along line 5(b)-5(b) in FIG. 5(a); FIG. 6(b) is a cross-sectional view taken along line 6(b)-6(b) in FIG. 6(a); FIG. 7(b) is a cross-sectional view taken along line 7(b)-7(b) in FIG. 7(a); FIG. 8(b) is a cross-sectional view taken along line 8(b)-8(b) in FIG. 8(a); FIG. 9(b) is a cross-sectional view taken along line 9(b)-9(b) in FIG. 9(a); FIG. 10(b) is a cross-sectional view taken along line 10(b)-10(b) in FIG. 10(a), and FIG. 11(b) is a cross-sectional view taken along line 11(b)-11(b) in FIG. 10(a). FIGS. 5(c), 6(c), 7(c), 8(c), 9(c), 10(c) and 11(c) show the corresponding separators of each embodiment.

DETAILED DESCRIPTION OF THE EMBODIMENTS

Introduction

For convenience of description, the terms "inner", "outer", "top", "bottom", "front", "rear", "right", "left", "side" and words of similar import will have reference to the various members and components of the bearings of the present disclosure as arranged and illustrated in the figures of the drawings and described hereinafter in detail.

It should also be understood that the terms "about," "approximately," "generally," "substantially" and like terms, used herein when referring to a dimension or characteristic of a component of the present disclosure, indicate that the described dimension/characteristic is not a strict boundary or parameter and does not exclude minor variations therefrom that are functionally the same or similar, as would be understood by one having ordinary skill in the art.

The present disclosure provides bearings with anti-friction separators such that all bearing parts move with pure rolling contact, i.e., without sliding contact among the bearing components. The bearings of the present disclosure include angular contact bearings, pure axial bearings as a particular case of an angular contact bearings when the contact angle α is equal to zero as described above, and radial bearings.

When the bearing is of the angular contact type, the rolling elements and the individual separators, as further described below, have a motion in the space known as "rolling cone" where they rotate around a fixed point. Because of this, the separators must have the shape of two truncated cones with common vertices and axes of symmetry. Its synthesis is much more complex than those for radial bearings. This means that the cylindrical separators for purely radial bearings cannot be used for angular contact bearings and vice versa because the kind of motion that they perform are very different. The structural features and configurations of the bearings of the angular contact and radial types according to aspects of the present disclosure are described in further detail below.

In one aspect, the present disclosure relates to angular contact bearings with anti-friction separators such that all bearing parts move with pure rolling contact, i.e., without sliding contact among the bearing components.

Figure 1:
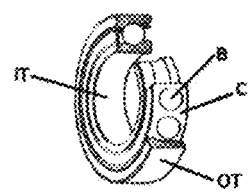
FIGS. 1(a) and 1(b) are perspective views showing an angular contact ball bearing (FIG. 1(a)) and an angular contact roller bearing (FIG. 1(b)) in the conventional art.
Figure 1:
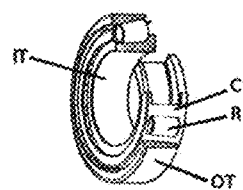
Figure 2:
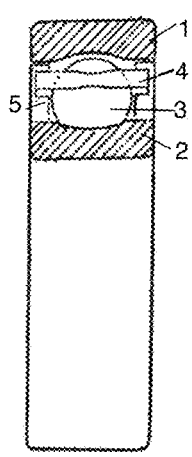
FIGS. 2(a)-2(b) show a partial sectional view and an axial view thereof of a purely radial ball bearing according to the Larsson patent.
Figure 2:
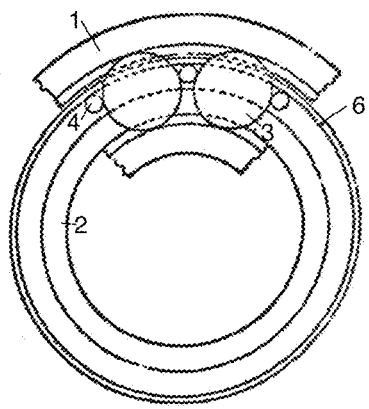
Figure 3:
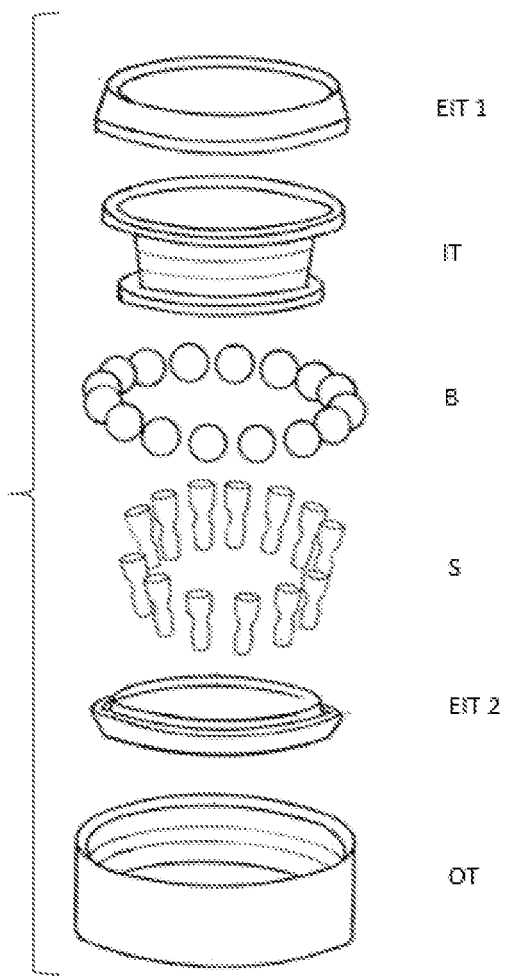
FIG. 3 is an exploded view of an angular contact ball bearing equipped with anti-friction separators according to an embodiment of the present disclosure.
Figure 4:
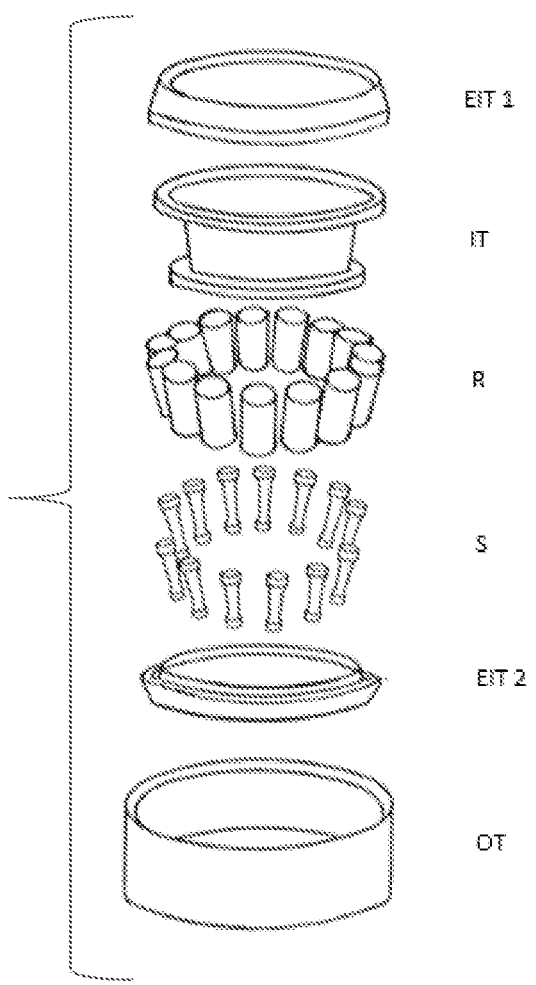
FIG. 4 is an exploded view of an angular contact roller bearing equipped with the anti-friction separators according to another embodiment of the present disclosure.
Figure 5:
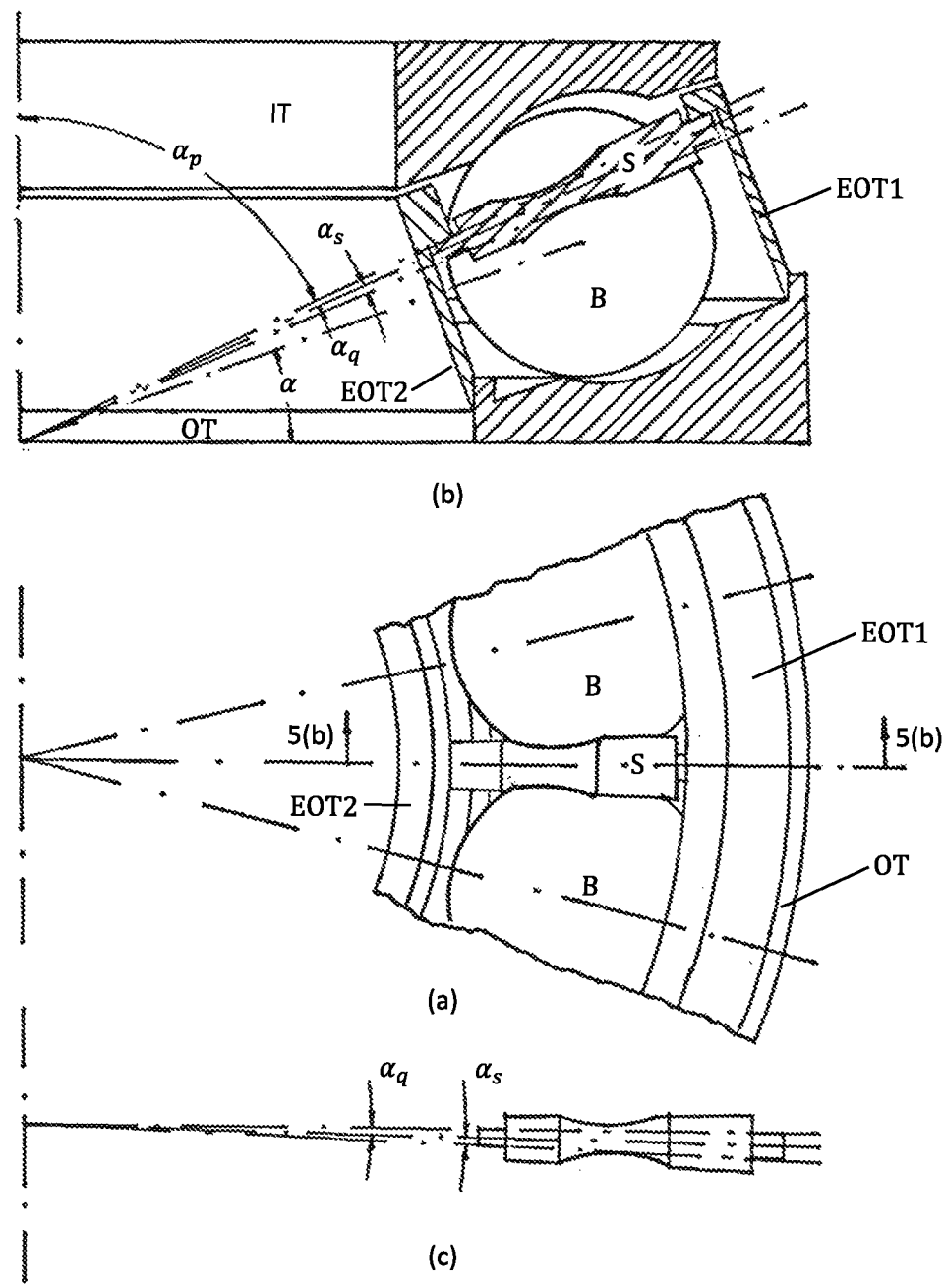
FIGS. 5(a)-5(c), 6(a)-6(c), 7(a)-7(c), 8(a)-8(c), 9(a)-9(c) and 10(a)-10(c) show embodiments of angular contact bearings according to the present disclosure for different types of rolling elements, balls B, or rollers R in cases when the separators contact the extensions of the inner track IT or the outer track OT.
Figure 6:
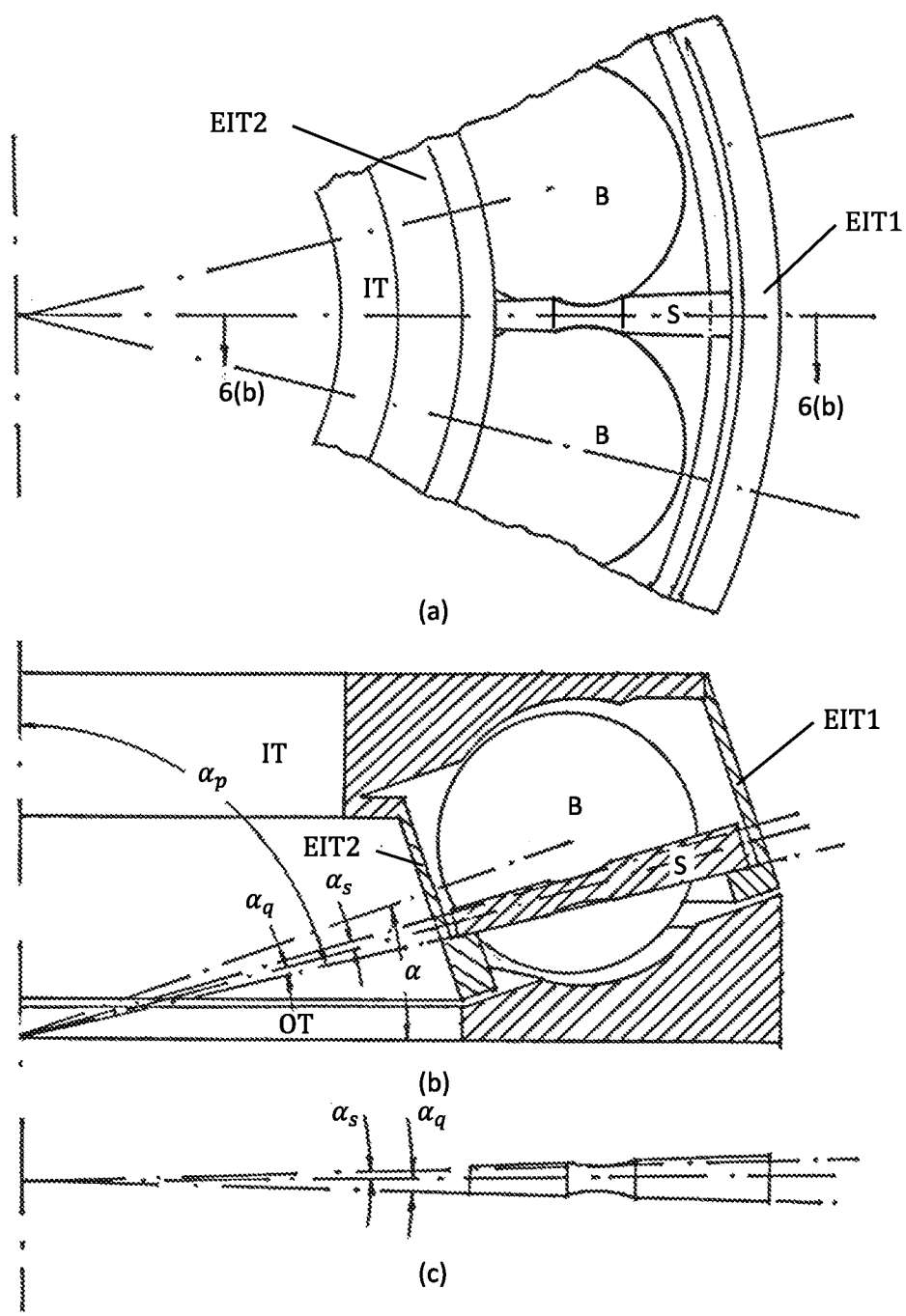
Figure 7:
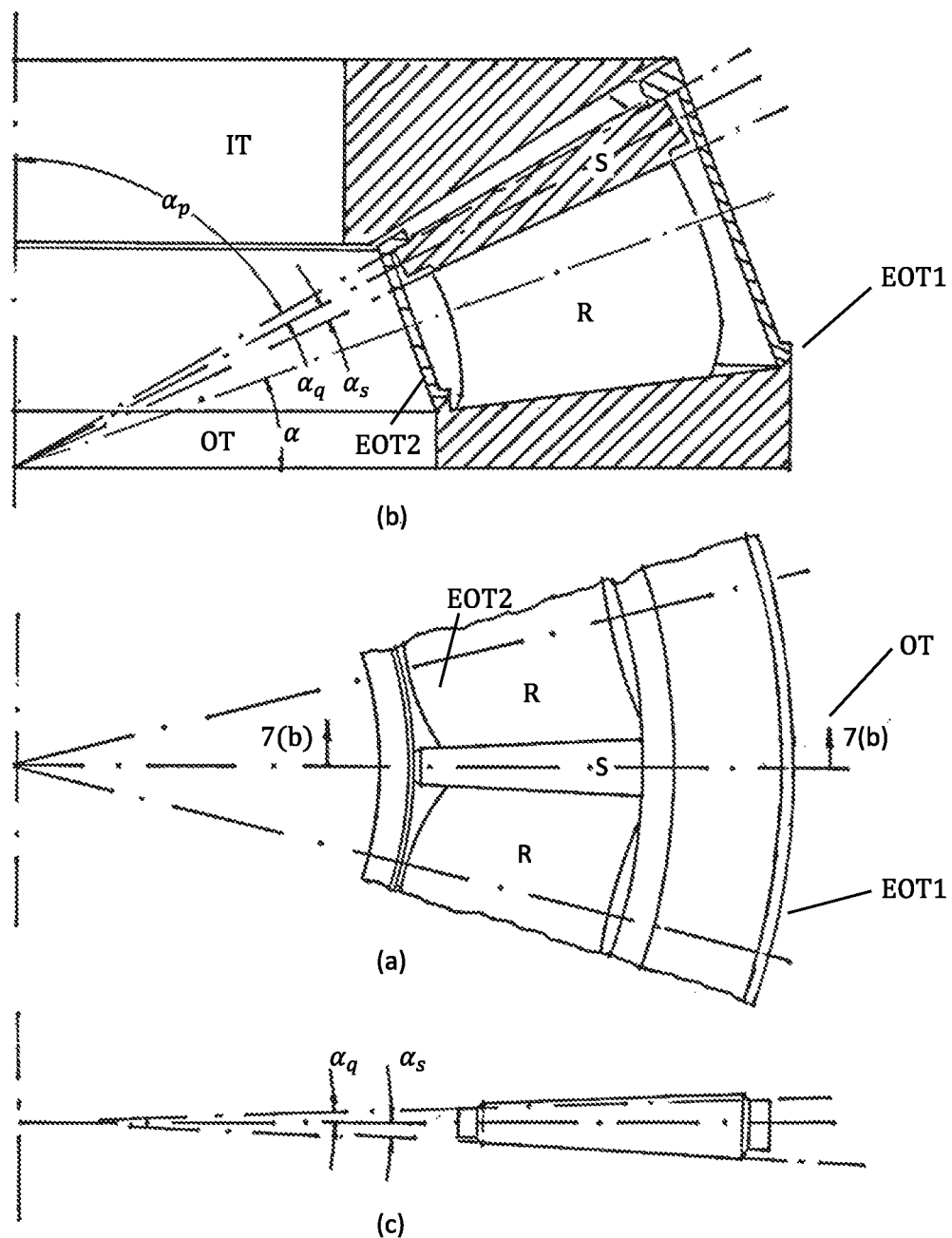
Figure 8:
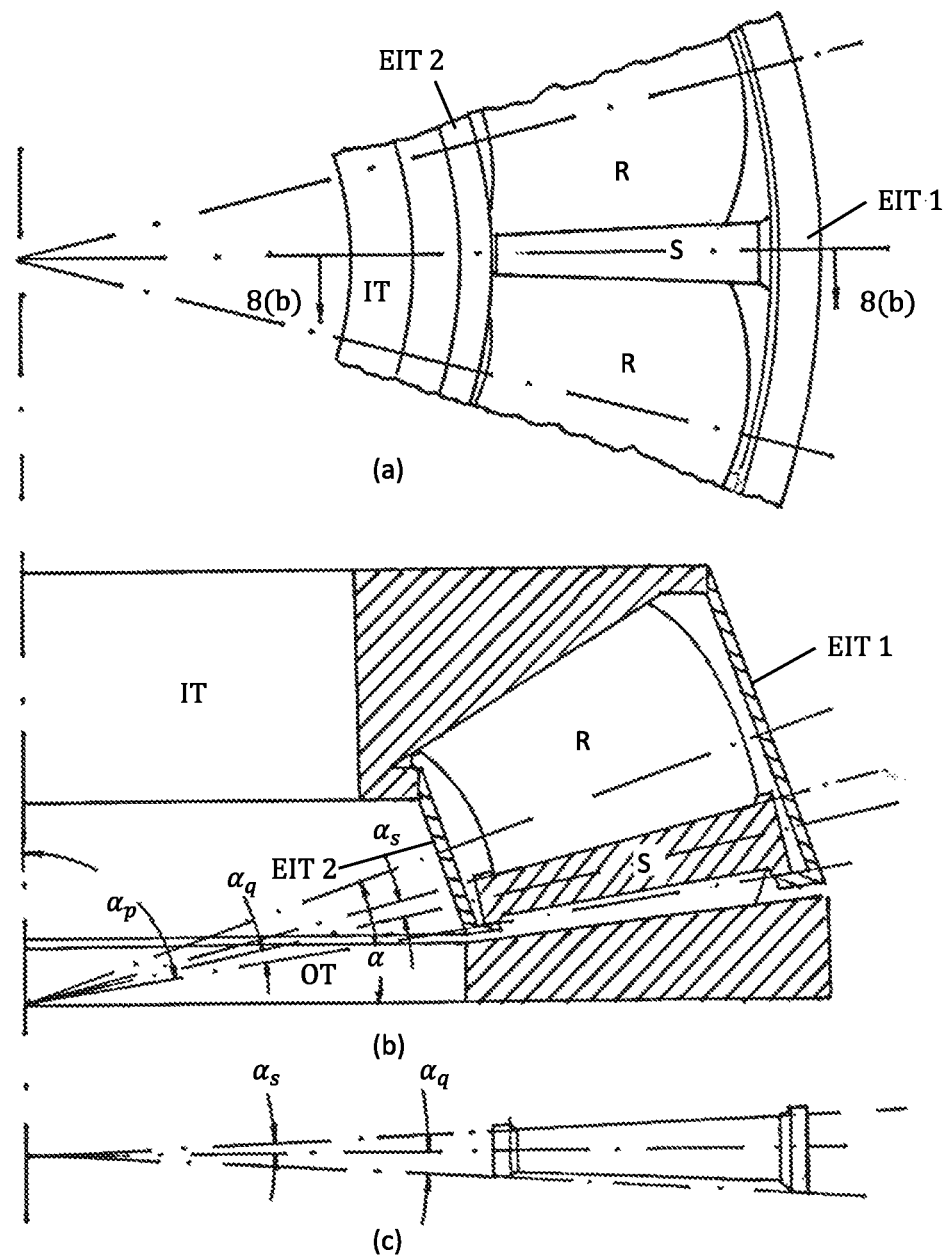
Figure 9:
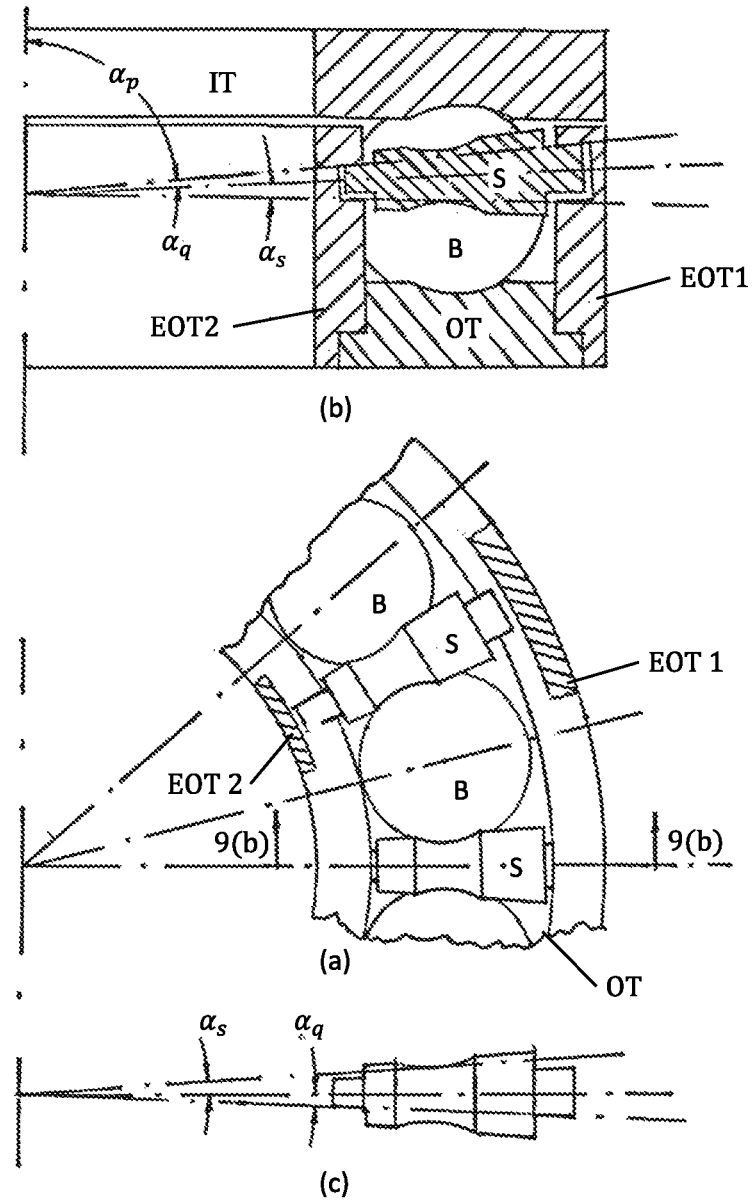

FIGS. 3 and 4 are exploded views illustrating the general components of angular contact of ball (FIG. 3) and roller (FIG. 4) bearings. Each of bearings in FIG. 3 and FIG. 4 includes an inner track IT, an outer track OT, first and second extension elements EIT1 and EIT2 of the inner track IT, rolling elements B (balls) for bearing in FIG. 3 and rolling elements R (rollers) for bearing in FIG. 4, and anti-friction separators or spacers S. The rolling elements are configured to be equidistantly placed between the inner track IT and outer track OT. Individual spacers S are configured to be placed between (i.e., to separate) the rolling elements, i.e., each spacer S is placed between two adjacent rolling elements that it separates, and in contact with extension elements EIT1 and EIT2. Spacers S are therefore also placed equidistantly on surfaces of extensions EIT1 and EIT2. Stated otherwise, the rolling elements are arranged in alternation with an equal whole number of spacers S.

Thus, in the embodiments of the angular contact bearings according to the present disclosure, outer track OT or inner track IT, along with corresponding extension elements EOT1 and EOT2 or EIT1 and EIT2, are arranged for pure rolling contact with respect to each other through an intervening series of spaced rolling elements. The rolling elements are anti-frictionally spaced from each other by intervening spacers S, which are, without sliding, in contact with first and second extension elements EIT1 and EIT2 or EOT1 and EOT2 of one of inner track IT or outer track OT and are carried by the rolling elements in pure rolling contact therewith Stated otherwise, the rolling elements which provide relative motion of outer track OT and inner track IT, are substantially uniformly and circumferentially spaced by locating between each of pair of adjacent rolling elements a spacer with pure rolling contact engagement with and supported by the rolling elements and the two extensions of one track. By this arrangement, friction usually produced by cages associated with conventional angular contact bearings, as described above, is eliminated.

In the angular contact bearings according to the embodiments of the present disclosure, spacers S and extension elements EIT1 and EIT2 or EOT1 and EOT2 of one of inner track IT and outer track OT according to the present disclosure replace the conventional cage and, therefore, eliminate the sliding contact associated with components of conventional angular contact bearings, as described above. When spacers S are placed between the rolling elements (e.g., balls or rollers) and in contact with extension elements EIT1 and EIT2 or EOT1 and EOT2 of the angular contact bearings according to the present disclosure, they guarantee pure rolling contact among all the components of the bearings. To achieve this, spacers S are positioned with pure rolling contact between the corresponding rolling elements along with extensions EIT1 and EIT2 or EOT1 and EOT2 being releasably secured to one of inner track IT and outer track OT.

In order to achieve the objects of the present disclosure, the condition of pure rolling contact is imposed among all the components of the bearings according to embodiments of the present disclosure. As such, each spacer S according to the present disclosure is configured in the form of two truncated cones with common vertices and axes of symmetry. For each spacer S, one of these truncated cones contacts, in its central surface, the two rolling elements that it separates, and the other truncated cone contacts first and second extension elements EIT1 and EIT2 or EOT1 and EOT2 at their ends. First and second extensions EIT1 and EIT2 or EOT1 and EOT2 make up another cone whose axis of symmetry coincides with the axis of rotation of the bearing, and its vertex matches with the vertex of the cones of the spacers. The vertex angle of the last-mentioned cone is also determined by the pure rolling condition imposed to the kinetics of the bearings.

Moreover, all of the cones lengths (heights) of spacers S and extensions EIT1 and EIT2 or EOT1 and EOT2 are only limited by the availability of space for its location. It is also important to note that all the angles of the vertexes of the three above mentioned cones are functions (non-shown) of the magnitudes of the other components of the bearing, including the radius of the tracks, the dimensions of the rolling elements, the number of the rolling elements and the contact angle $\alpha$. The lengths of the cones are determined as function of the angles of its vertexes and the available space for its location in the bearing.

It will be appreciated that for bearings of the contact angular type according to the present disclosure, the rolling elements and the individual spacers have a motion in space known as a "rolling cone" where they rotate around a fixed point. Because of this, the spacers according to the present disclosure have to have the form of two truncated cones with common vertices and axes of symmetry as described above. It will also be appreciated that the synthesis for such contact angular type bearings is much more complex than those for radial bearings. This means that the cylindrical spacers for purely radial bearings, such as disclosed by Larsson as described above, cannot be used for angular contact bearings and vice versa because the kind of motion that they perform are very different.

Presentation of the Designs

Various designs of the present disclosure will be described more fully hereinafter with reference to the accompanying drawings, in which exemplary embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

FIGS. 5(a)-5(c), 6(a)-6(c), 7(a)-7(c), 8(a)-8(c), 9(a)-9(c), 10(a)-10(c), and 11(a)-11(c) show angular contact bearings equipped with spacers according to various embodiments of the present disclosure. There are two possible locations for the spacers for each type of rolling elements. This depends on the extensions of the track that they contact; the inner track, or the outer track. The designs are shown with the axis of symmetry of the bearings in a vertical position.

To be able to observe the rolling elements and its separators, in the figures designated with (a), i.e. 5(a), 6(a), etc., the track that does not make contact with the separators is removed. The figures designated with (c) are side views of the spacers corresponding to each case showing the vertex angles of the separator cones.

FIGS. 5(a)-5(c) show an embodiment of an angular contact ball bearing according to the present disclosure in which spacers S are in contact with the extensions of the outer track EOT1 and EOT2. FIG. 5(a) is a fragmentary axial view and FIG. 5(b) is a cross-sectional view along the line 5(b)-5(b) in FIG. 5(a).

FIGS. 6(a)-6(c) show an embodiment of an angular contact ball bearing according to the present disclosure in which spacers S are in contact with the extension of the inner track EIT1 and EIT2. FIG. 6(a) is a fragmentary axial view and FIG. 6(b) is a cross-sectional view along the line 6(b)-6(b) in FIG. 6(a).

FIGS. 7(a)-7(c) show an embodiment of an angular contact roller bearing according to the present disclosure in which spacers S are in contact with the extensions of the outer track EOT1 and EOT2. FIG. 7(a) is a fragmentary axial view and FIG. 7(b) is a cross-sectional view along the line 7(b)-7(b) in FIG. 7(a).

FIGS. 8(a)-8(c) show an embodiment of an angular contact roller bearing according to the present disclosure in which spacers S are in contact with the extensions of the inner track, EIT1 and EIT2. FIG. 8(a) is a fragmentary axial view and FIG. 8(b) is a cross-sectional view along the line 8(b)-8(b) in FIG. 8(a).

FIGS. 9(a)-9(c) show a purely axial ball bearing, corresponding to the special case when contact angle $\alpha$ is equal to zero, equipped with a spacer S arrangement according to the present disclosure. FIG. 9(a) is a fragmentary axial view and FIG. 9(b) is a cross-sectional view along the line 9(b)-9(b) in FIG. 9(a).

FIGS. 10(a)-10(c) show a purely axial roller bearing, corresponding to the special case when contact angle $\alpha$ is equal to zero, equipped with a spacer S arrangement according to the present disclosure. FIG. 10(a) is a fragmentary axial view and FIG. 10(b) is a cross-sectional view along the line 10(b)-10(b) in FIG. 10(a).

In the embodiments of the purely axial bearings shown in FIGS. 9(a)-9(c) and 10(a)-10(c), due to the symmetry of the bearing along the horizontal axis, spacers S that contact extensions of the inner track, EIT1 and EIT2 are identical to those that contact the extensions of the outer track, EOT1 and EOT2. Therefore, unlike for the angular contact bearings of the present disclosure described above, for purely axial bearings the configuration of spacers S and the track does not depend on which of the two tracks they contact.

FIGS. 11(a)-11(c) show another embodiment of a bearing according to the present disclosure employing barrel or keg-shaped rolling elements. FIG. 11(a) is a fragmentary axial view and FIG. 11(b) is a cross-sectional view along the line 11(b)-11(b) in FIG. 11(a). This embodiment illustrates the versatility of the bearings according to the present disclosure, in which various rolling element configurations may be employed.

Figure 12:
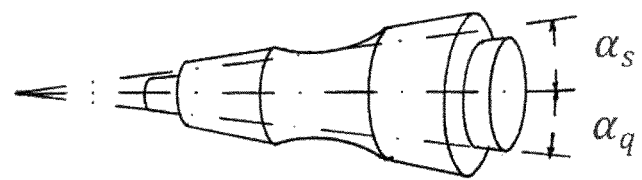
FIGS. 12(a)-12(d) are perspective views of the different forms of the separators according to the various embodiments of the present disclosure.
Figure 12:
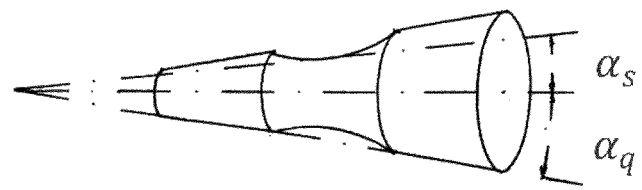
Figure 12:
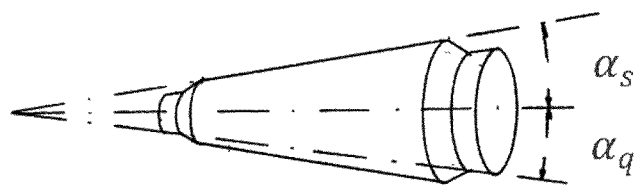
Figure 12:
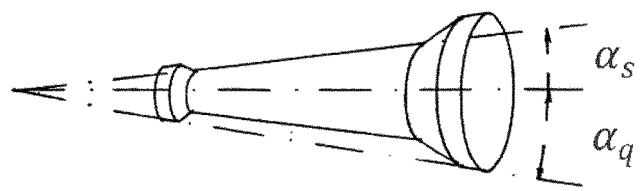

FIGS. 12(a)-12(d) are perspective views showing embodiments of separators/spacers S according to the present disclosure, including corresponding angles $\alpha_s$ and $\alpha_q$ for each spacer. In these figures, FIG. 12(a) shows separator S used in the angular contact ball bearing of FIGS. 5(a)-5(c) and the purely axial ball bearing of FIGS. 9(a)-9(c); FIG.

12(b) shows separator S used in the angular contact ball bearing of FIGS. 6(a)-6(c); FIG. 12(c) shows separator S used in the angular contact roller bearing of FIGS. 7(a)-7(c) and the purely axial roller bearing of FIGS. 10(a)-10(c), this type of separator can also be used for the designs shown in the FIGS. 5(a)-5(c), 9(a)-9(c), and 11(a)-11(c). Finally, FIG. 12(d) shows separator S used in the angular contact roller bearing of FIGS. 8(a)-8(c).

As shown in FIGS. 12(a)-12(b), each of the spacers for the ball bearing is provided with a circumferential groove so that the balls prevent the displacement of the spacers in their axis of symmetry direction. This is a modification from the original double truncated cone shape of the spacers. When the bearings incorporate rollers, this effect occurs due to the designs of the ends of the spacers.

Therefore, in the case of ball bearings, balls prevent the displacement of spacers in the direction of its axis of symmetry through the slots on the spacers. In the case of roller bearings, when the contact is made with outer track OT, the extension elements of the tracks hinder this movement. On the other hand, when the contact is made with inner track IT, the rollers prevent such displacement as is shown in the figures.

It is interesting to observe that according to a feature of the angular contact bearings in the embodiments of the present disclosure, for spacers in contact with outer track OT angle $\alpha_s$ is always greater than angle $\alpha_q$. In contrast, for spacers in contact with inner track IT angle $\alpha_q$ is always greater than angle $\alpha_s$.

Given that all the extensions of the tracks of the embodiment shown in FIGS. 5(a)-5(c), 6(a)-6(c), 7(a)-7(c), 8(a)-8(c), 9(a)-9(c), 10(a)-10(c), and 11(a)-11(c) are very similar, it is enough to take one of them to describe the characteristics of all of them. For this reason, it has been chosen the one in FIGS. 8(a)-8(c).

Figure 13:
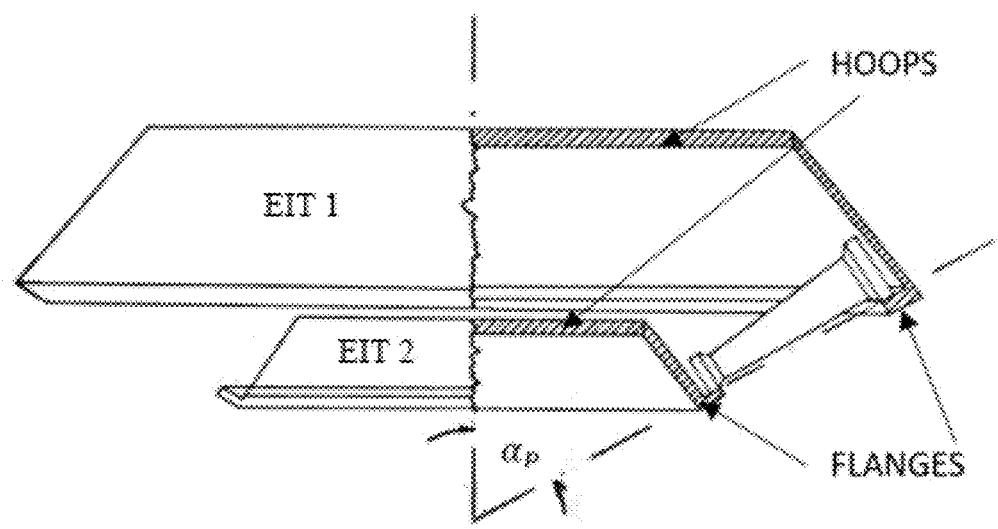
FIG. 13 shows, as an example, a radial view in partial cross-section of the two extensions of the inner track, EIT1 and EIT2, with one separator in its position when they are isolated from the bearing. For this case, the embodiment of FIG. 8 has been selected but with an increased contact angle α.

FIG. 13 is a radial view in partial cross-section of the two extensions of the inner track in FIGS. 8(a)-8(c) when they are separated from the rest of the angular contact bearing components. There is only one separator in its position and the contact angle $\alpha$ is duplicate to clarify the figure.

From this figure it is possible to observe that the two extensions of the track, EIT1 and EIT2, have the general form of thin-walled, truncated cones. The upper hoops of the two truncated cones are removably mounted by sufficient friction fit, to opposing ends of the inner track. The lower ends of the two truncated cones have flanges of conical surfaces where the separators roll with pure rolling contact. These conical surfaces form the angle $\alpha_p$ with the axis of symmetry of the bearing, as it is shown.

The spacers and extension elements for the angular contact bearings according to the embodiments of the present disclosure can be easily manufactured from a series of solid materials including, but not limited to, steel, aluminum, bronze, plastics, polyamide, fiberglass, and ceramic. The materials do not need to have a high resistance. The angular contact bearings according to the embodiments of the present disclosure are suitable for fabrication in any size and number of rolling elements and corresponding spacers.

Given the form of thin-walled truncated cones as described above, the extensions of the track can be manufactured from thin sheets of metal by a die cutting or pressing process with which it is possible to obtain a large amount of track extensions in a short time and with great precision which is very important for the proper functioning of the bearings.

Assembly of the angular bearings according to the present disclosure could be as follows: first, one of the extensions tracks is securely mounted to one of the inner and outer track edge, then all the rolling elements are assembled, all the separators are placed between the corresponding pair of rolling elements and finally the other extension track is securely mounted on the other end of the track.

In another aspect, the present disclosure is directed to radial bearings with anti-friction spacers (also referred herein as "separators"). According to this aspect, individual spacers and two extensions are rigidly attached to anyone of two inner or outer tracks instead of the previously described conventional cages used in bearings in order to avoid the sliding contact among all the bearing components so as to eliminate the friction, wear and heat generation in the bearings. In bearings of the radial type, load is applied to the bearing in the radial direction of the bearing. In these kind of bearings, the rolling elements used are usually balls, rollers, or kegs (hereinafter also referred to as "barrels").

When the pure rolling condition among all the bearing parts is imposed to the kinetics of the radial bearings, separators with two coaxial cylinders of different diameters are obtained, where one cylinder contacts and separates two adjacent rolling elements on its central part, and the other cylinder contacts the two track extension surfaces at both ends. Also, track extensions with two cylindrical hoop surfaces of the same radius are obtained, where both ends of the separators roll on internal hoop surfaces of the track extensions. These extensions are rigidly united to anyone of the two inner or outer bearing tracks.

The diameters of the two coaxial cylinder spacers are functions of the dimensions of the other components of the bearing, including the mean radius of the bearing, the number and radius of the rolling elements, and the two equal radii of both internal cylindrical hoop surfaces of the two track extensions where the ends of the separators roll. The cylinder lengths of the separators and hoop extensions are only limited by the availability of axial space for its location.

When both ends of the spacers contact the two internal hoop surfaces extensions of the inner track, the diameters of their ends are greater than the diameter of its central cylinder that contact and separate the rolling elements, and when the ends of the separators contact the two internal hoop surfaces extensions of the outer track, the opposite is true.

FIGS. 14(a)-14(c), 15(a)-15(c), 16(a)-16(c), 17(a)-17(c), 18(a)-18(c), 19(a)-19(c), 20(a)-20(c) and 21(a)-21(c) show radial bearings according to various embodiments of the present disclosure. These figures illustrate the following components of the radial bearings:

balls B; rollers R; kegs or barrels K; separators or spacer S; inner tracks IT; outer tracks OT; extension EIT1 of inner track 1; extension EIT2 of inner track 2; extension EOT1 of outer track 1; extension EOT2 of outer track 2; diameter DC of the central cylinder of the separator; diameter DE of the cylinder at the two ends of the separator; mean radius RM of the bearing; radius RB of the balls; radius RR of the rollers; radius RK of the kegs or barrels at its central part; radius REIT of the internal cylindrical hoop surface of the two inner track extensions where both ends of the separators roll; and radius REOT of the internal cylindrical hoop surface of the two outer track extensions where the two ends of the spacers roll. The radial bearings according to the present embodiments are provided with individual anti-friction spacers S in the shape of a double coaxial cylinder and two extensions (EIT1, EIT2, EOT1, EOT2) of anyone of the two tracks (IT, OT) with the form of cylindrical hoops such that all of the bearing components move with pure rolling contact, i.e., without sliding contact among the bearing components.

To achieve the above advantages, each separator (S) is placed between a pair of adjacent rolling elements (B, R, K) to separate them with pure rolling contact in its central surface and rolling at its ends without sliding on the two internal cylindrical hoop surfaces of both extensions (EIT1, EIT2, EOT1, EOT2) of anyone of the inner or outer track (IT, OT).

For each type of rolling elements, balls B, rollers R or kegs/barrels K, there are two possibilities of location for the spacers S: when both spacer ends are in contact with the two extensions EIT1, EIT2 of the inner track IT; and when they contact both extensions EOT1, EOT2 of the outer track OT. These cases are shown in the drawings as further described below.

Figure 14:
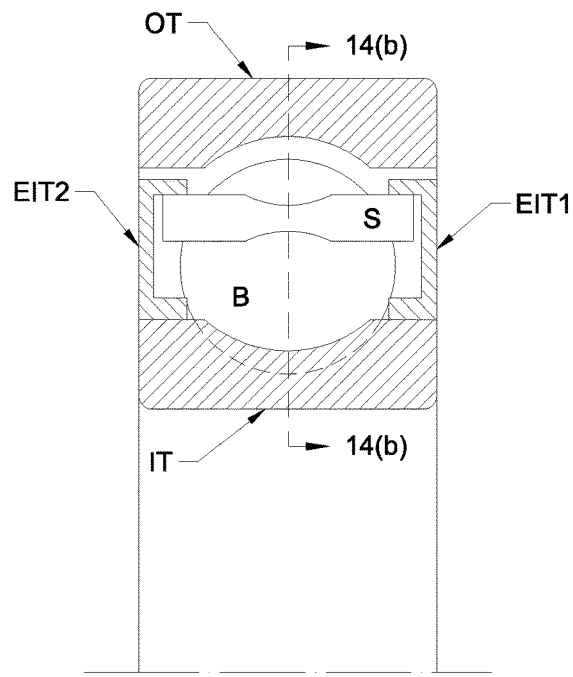
FIGS. 14(a)-14(c) show a radial bearing according to one embodiment of the present disclosure, where
Figure 14:
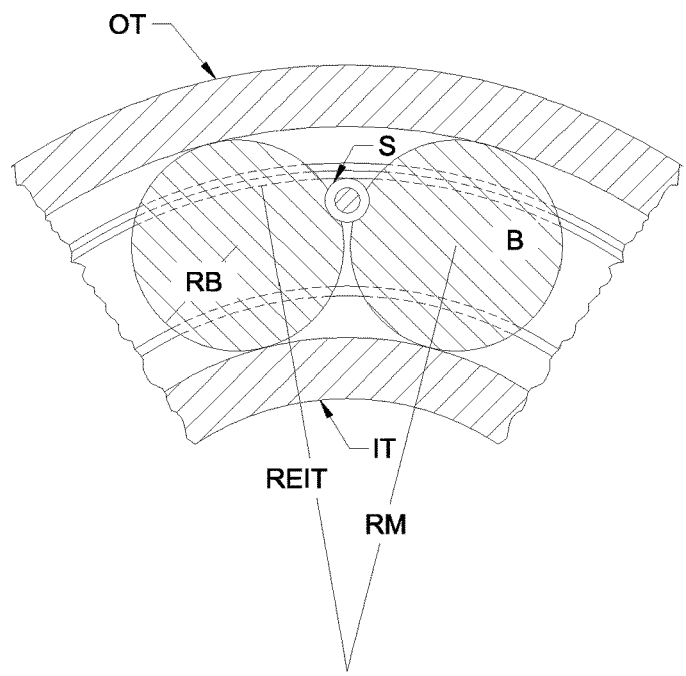
Figure 14:
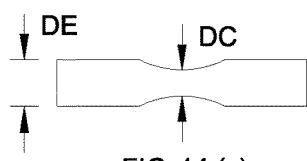
Figure 15:
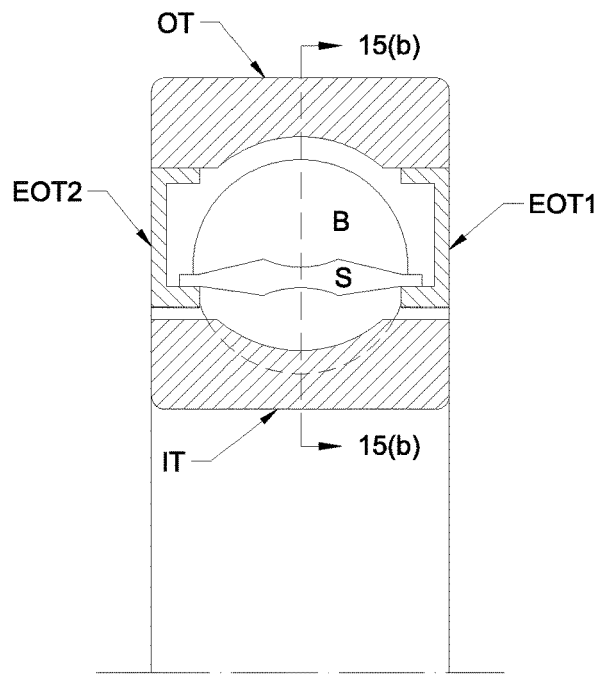
FIGS. 15(a)-15(c) show a radial bearing according to another embodiment of the present disclosure, where
Figure 15:
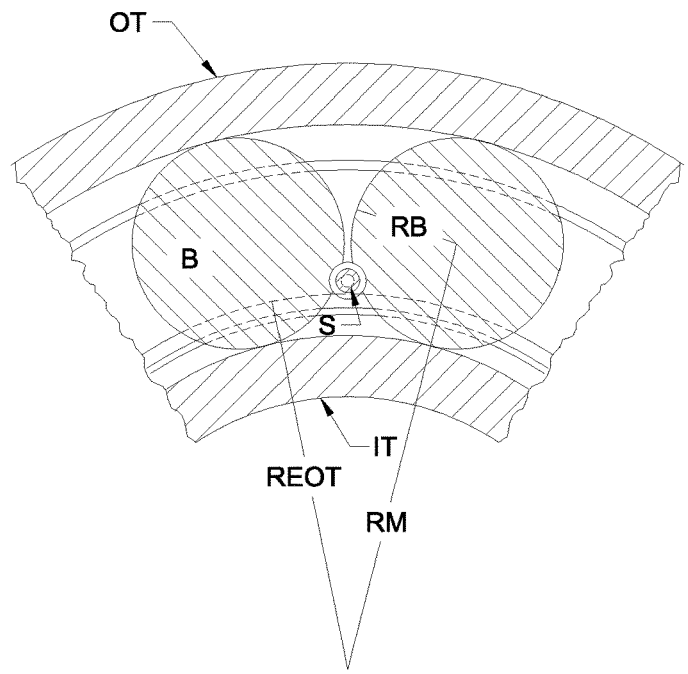
Figure 15:
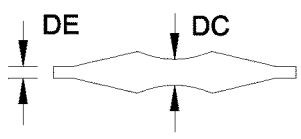

FIGS. 14(a)-14(c) show an embodiment of a radial ball bearing according to the present disclosure in which spacers S are in contact with the two internal cylindrical hoop surfaces of both extensions of inner tracks EIT1 and EIT2. FIG. 14(a) is a fragmentary raial view in partial cross-section of the radial ball bearing, FIG. 14(b) is a cross-sectional view taken along the line 14(a)-14(a) in FIG. 14(a), and FIG. 14(c) shows the corresponding spacer S used in this embodiment.

FIGS. 15(a)-15(c) show an embodiment of a radial ball bearing according to the present disclosure in which spacers S are in contact with the two internal cylindrical hoop surfaces of both extensions of outer tracks EOT1 and EOT2. FIG. 15(a) is a fragmentary radial view in partial cross-section of the radial ball bearing, FIG. 15(b) is a cross-sectional view taken along the line 15(a)-15(a) in FIG. 15(a), and FIG. 15(c) shows the corresponding spacer S used in this embodiment.

Figure 16:
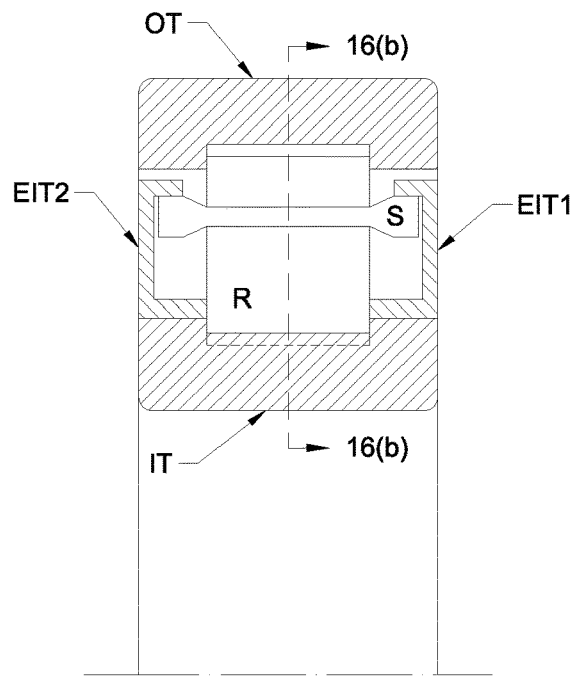
FIGS. 16(a)-16(c) show a radial bearing according to another embodiment of the present disclosure; where
Figure 16:
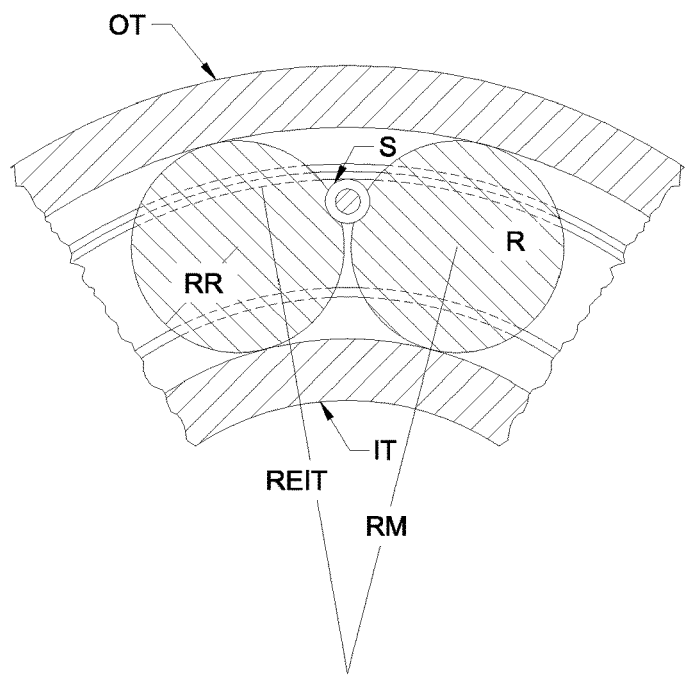
Figure 16:
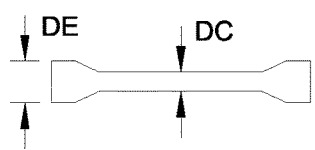

FIGS. 16(a)-16(c) show an embodiment of a radial roller bearing according to the present disclosure in which spacers S are in contact with the two internal cylindrical hoop surfaces of both extensions of inner tracks EIT1 and EIT2. FIG. 16(a) is a fragmentary radial view in partial cross-section of the radial roller bearing, FIG. 16(b) is a cross-sectional view taken along the line 16(a)-16(a) in FIG. 16(a), and FIG. 16(c) shows the corresponding spacer S used in this embodiment.

Figure 17:
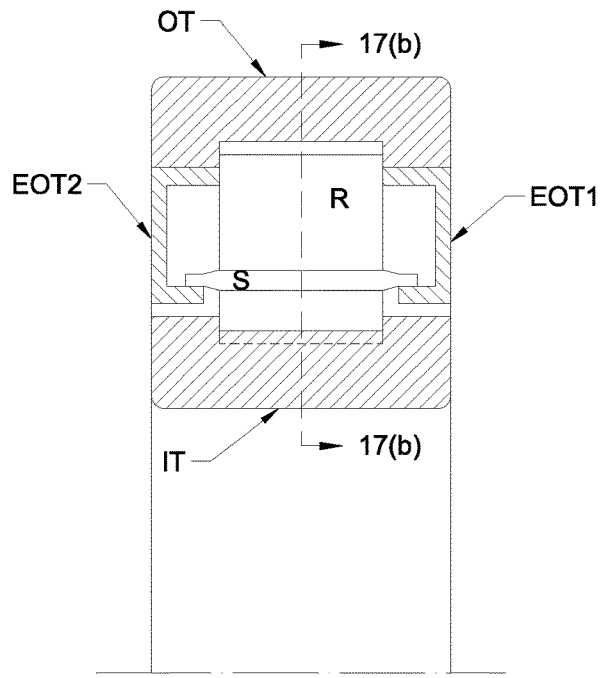
FIGS. 17(a)-17(c) show a radial bearing according to another embodiment of the present disclosure, where
Figure 17:
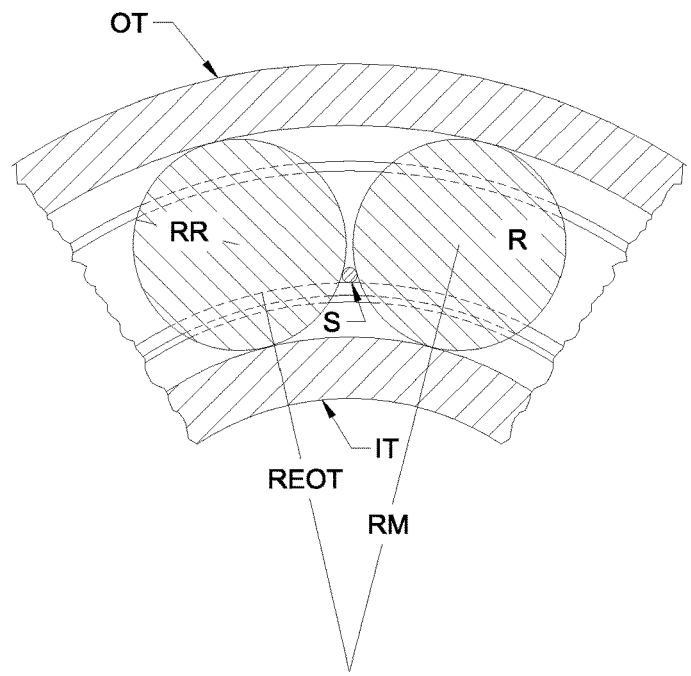
Figure 17:
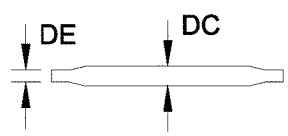

FIGS. 17(a)-17(c) show an embodiment of a radial roller bearing according to the present disclosure in which separators S are in contact with the two internal cylindrical hoop surfaces of both extensions of outer tracks EOT1 and EOT2. FIG. 17(a) is a fragmentary radial view in partial cross-section of the radial roller bearing, FIG. 17(b) is a cross-sectional view along the line 17(a)-17(a) in FIG. 17(a), and FIG. 17(c) shows the corresponding spacer S used in this embodiment.

Figure 18:
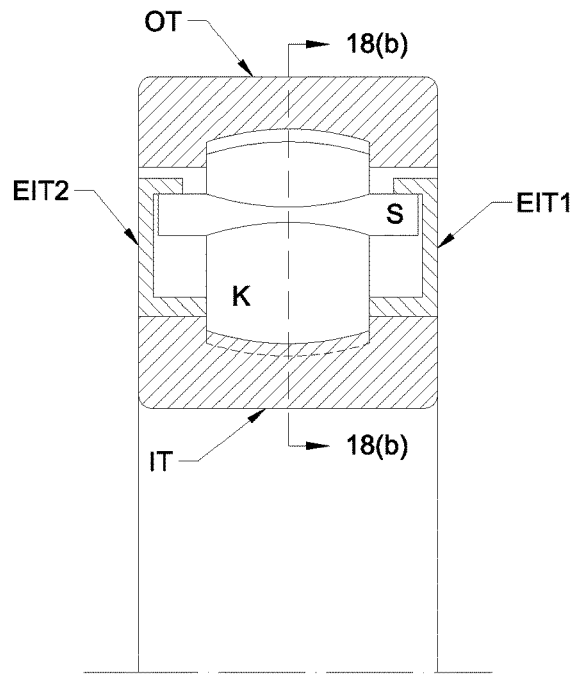
FIGS. 18(a)-18(c) show a radial bearing according to another embodiment of the present disclosure, where
Figure 18B:
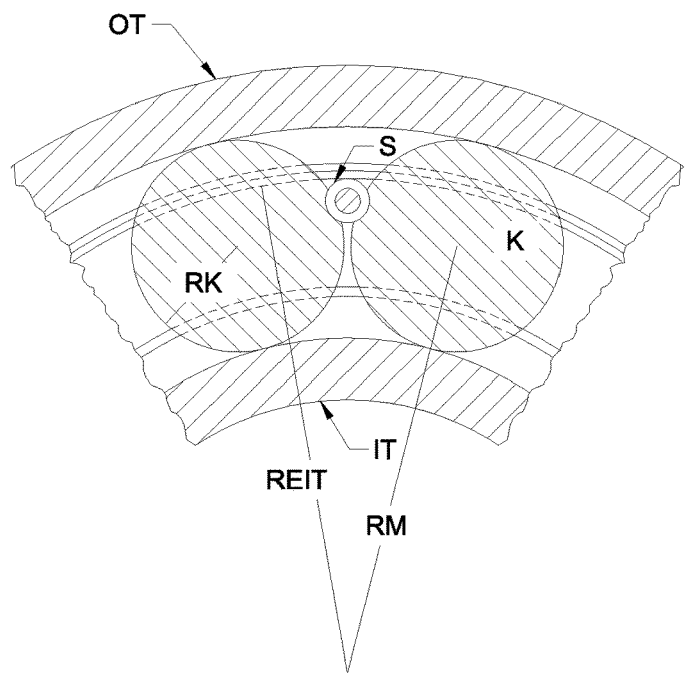
Figure 18:
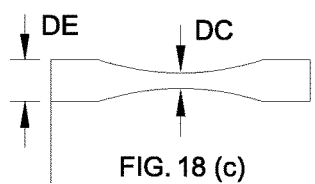

FIGS. 18(a)-18(c) show an embodiment of a radial barrel bearing according to the present disclosure in which spacers S are in contact with the two internal cylindrical hoop surfaces of both extensions of inner tracks EIT1 and EIT2. FIG. 18(a) is a fragmentary radial view in partial cross-section of the radial barrel bearing, FIG. 18(b) is a cross-sectional view taken along line 18(a)-18(a) in FIG. 18(a), and FIG. 18(c) shows the corresponding spacer S used in this embodiment.

Figure 19:
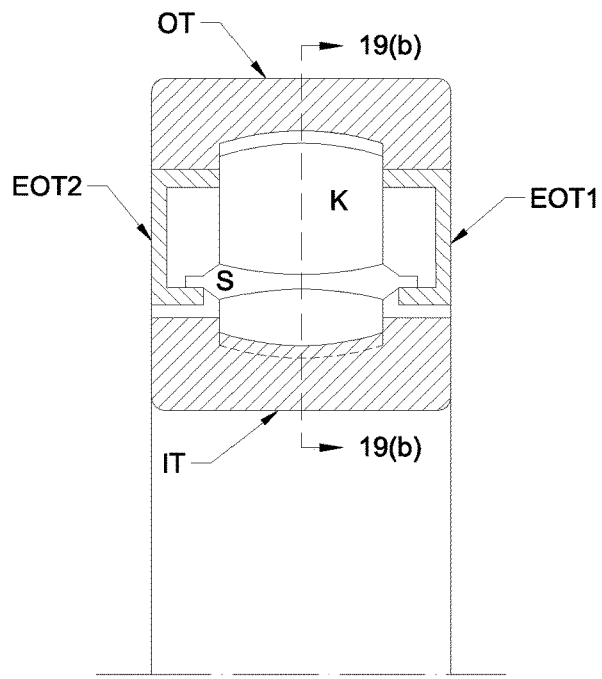
FIGS. 19(a)-19(c) show a radial bearing according to another embodiment of the present disclosure, where
Figure 19:
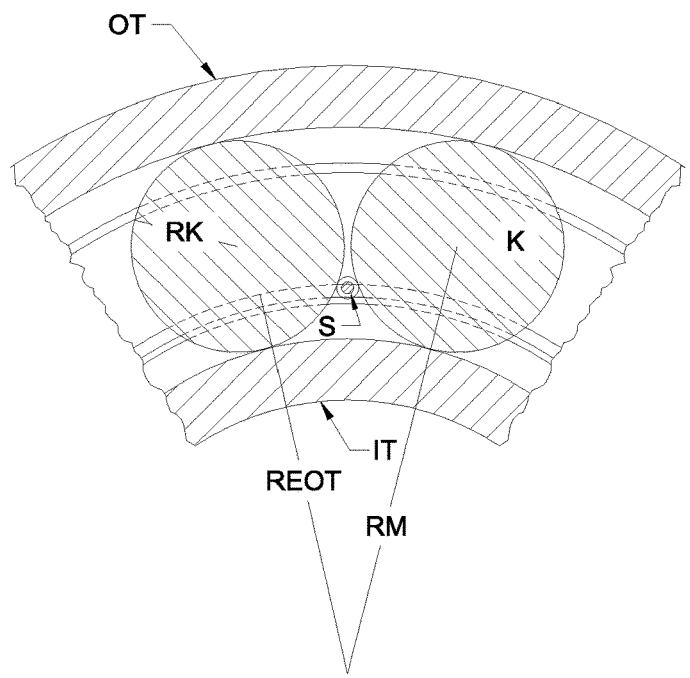
Figure 19:
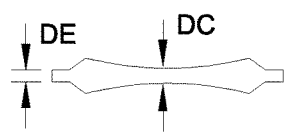

FIGS. 19(a)-19(c) show an embodiment of a radial barrel bearing according to the present disclosure in which spacers S are in contact with the two internal cylindrical hoop surfaces of both extensions of outer tracks EOT1 and EOT2. FIG. 19(a) is a fragmentary radial view in partial cross-section of the radial barrel bearing, FIG. 19(b) is a cross-sectional view along the line 19(a)-19(a) in FIG. 19(a), and FIG. 19(c) shows the corresponding spacer S used in this embodiment.

Thus, the foregoing exemplary embodiments of the present disclosure illustrate radial bearings in which spacers S are in contact with the internal cylindrical hoop surface extensions of inner track IT for the case where the rolling elements are in the form of balls B (FIGS. 14(a)-14(c)), rollers R (FIGS. 16(a)-16(c), and kegs or barrels K (FIGS. 18(a)-18(c)). The foregoing exemplary embodiments of the present disclosure also illustrate radial bearings in which spacers S are in contact with the internal cylindrical hoop surface extensions of outer track OT for the case where the rolling elements are in the form of balls B (FIGS. 15(a)-15 (c)), rollers R (FIGS. 17(a)-17(c), and kegs or barrels K (FIGS. 19(a)-19(c)).

Figure 20:
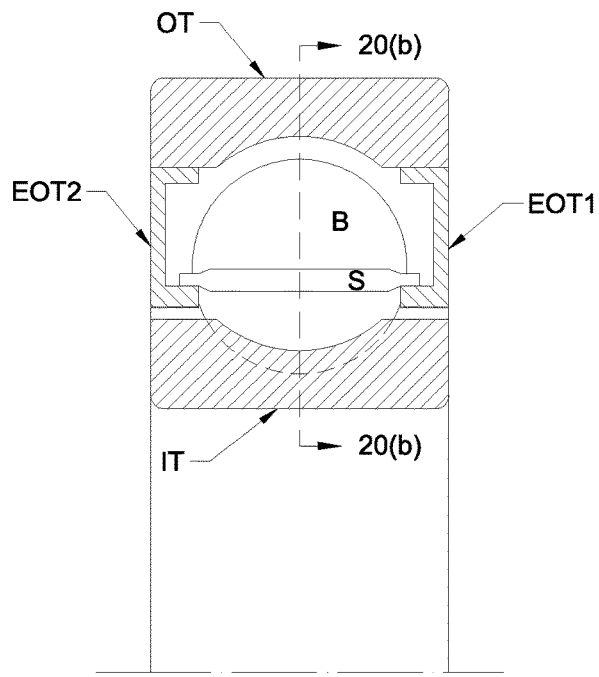
FIGS. 20(a)-20(c) show a radial bearing according to another embodiment of the present disclosure, where
Figure 20:
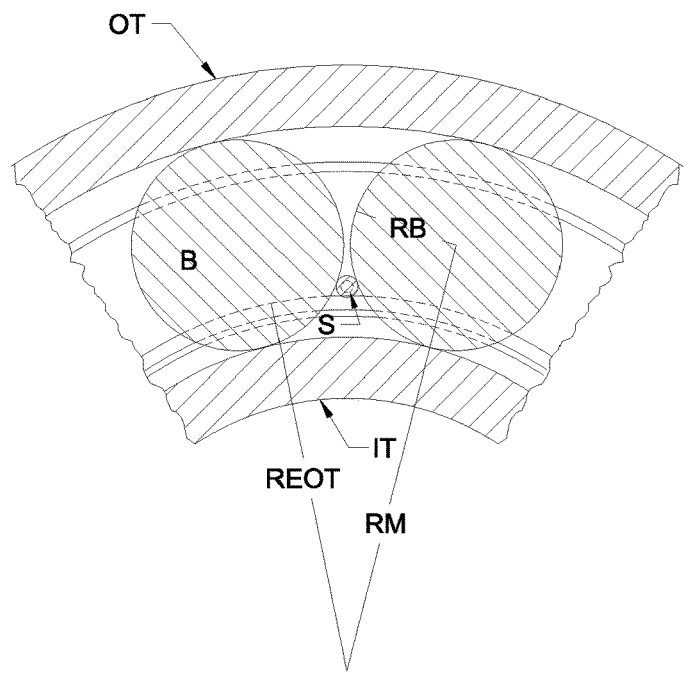
Figure 20:
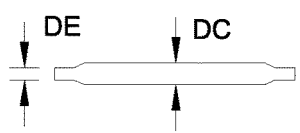

FIGS. 20(a)-20(c) show an embodiment of a radial ball bearing according to the present disclosure in which spacers S are in contact with the two internal cylindrical hoop surfaces of both extensions of outer tracks EOT1 and EOT2. FIG. 20(a) is a fragmentary radial view in partial cross-section of the radial ball bearing, FIG. 20(b) is a cross-sectional view taken along the line 20(a)-20(a) in FIG. 20(a), and FIG. 20(c) shows the corresponding spacer S used in this embodiment.

Figure 21:
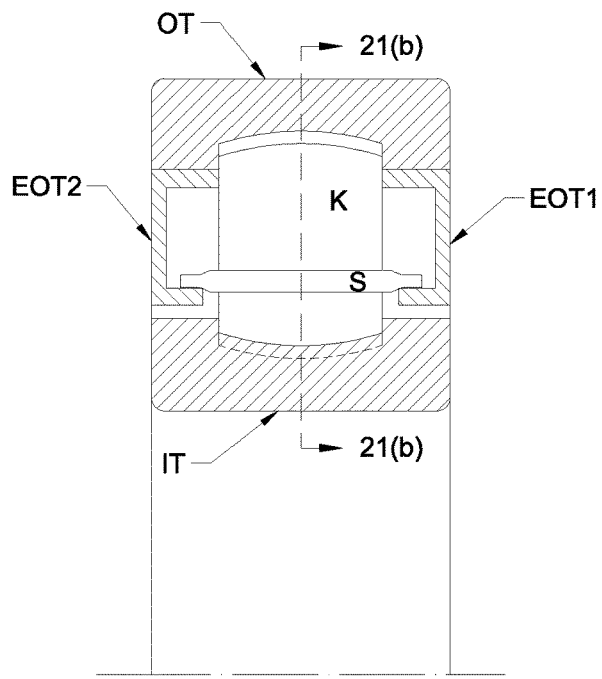
FIGS. 21(a)-21(c) show a radial bearing according to another embodiment of the present disclosure, where
Figure 21:
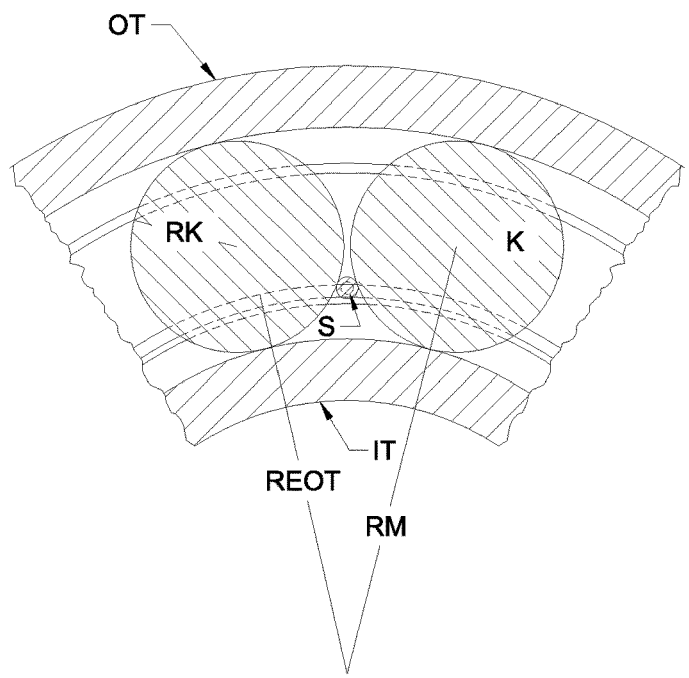
Figure 21:
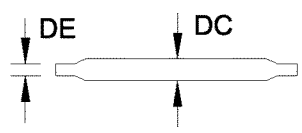

FIGS. 21(a)-21(c) show an embodiment of a radial barrel bearing according to the present disclosure in which spacers S are in contact with the two internal cylindrical hoop surfaces of both extensions of outer tracks EOT1 and EOT2. FIG. 21(a) is a fragmentary radial view in partial cross-section of the radial barrel bearing, FIG. 21(b) is a cross-sectional view taken along the line 21(a)-21(a) in FIG. 21(a), and FIG. 21(c) shows the corresponding spacer S used in this embodiment.

In FIGS. 14(a)-14(c), 15(a)-15(c), 18(a)-18(c) and 19(a)-19(c), each spacer S for the ball and barrel bearings is provided with a groove on their surfaces so that the corresponding balls and barrels prevent the displacement of the spacers S in their axis of symmetry direction. This is a modification from the original double cylindrical shape of the spacer, which does not alter the kinetic of the bearing.

In the embodiments of FIGS. 15(a)-15(c) and 19(a)-19(c), when spacers S contact the extensions of both outer tracks, the rolling elements (corresponding balls and barrels) and the two track extensions impede the axial displacement of separators S at the same time. When the bearings incorporate rollers and the spacers contact the two extensions of the inner track, as shown FIGS. 16(a)-16(c), the rollers prevent the aforementioned axial displacement due to the inverted arrowhead-like shape of the ends of spacers S, and when spacers S are in contact with both extensions of the outer track, the two track extensions are the ones that prevent the axial displacement of spacer S due to the similar shape of the extreme of an arrow of the corresponding spacer ends, as shown in FIGS. 17(a)-17(c). It can be seen that spacer S shown in the embodiment of FIG. 17(c) can also be used when the rolling elements are balls or barrels, as shown in FIGS. 20(a)-20(c) and 21(a)-21(c), respectively.

Figure 22:
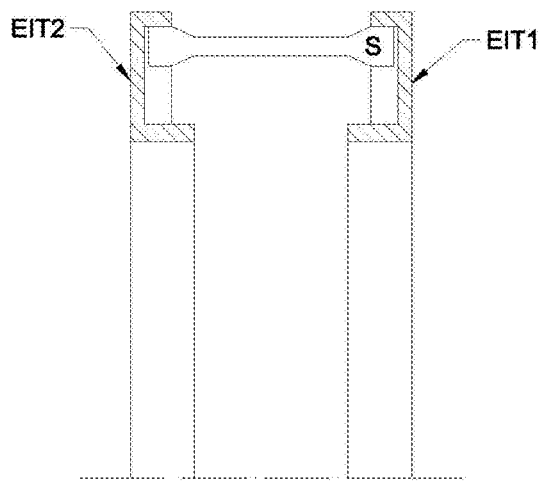
FIGS. 22(a) and 22(b) correspond to the embodiment of the radial bearing shown in FIGS. 16(a) and 17(a), respectively, and show, as an example, fragmentary views in partial cross-section of the two extensions of one of the tracks with one separator in its position when these components are isolated from the bearing.
Figure 22:
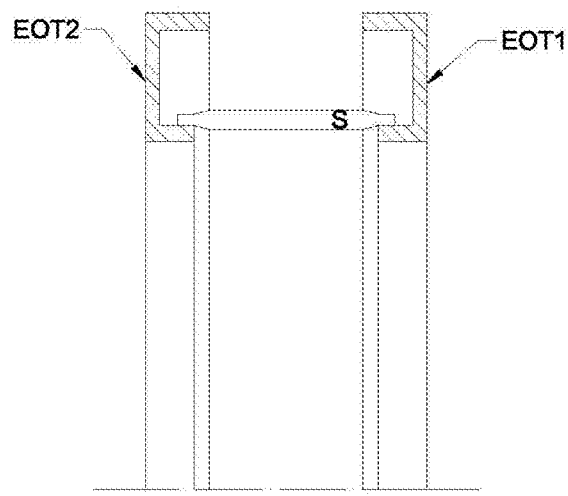

FIGS. 22(a) and 22(b) show, as an example, fragmentary views in partial cross-section of the two extensions of one of the tracks with one separator in its position when these components are isolated from the bearing. For these cases, FIG. 22(a) corresponds to the embodiment show in FIG. 16(a) where the two extensions EIT1 and EIT2 are mounted to the inner track IT, and FIG. 22(b) corresponds to the embodiment show in FIG. 17(a) where the two extensions, EOT1 and EOT2 are mounted to the outer track OT.

Figure 23:
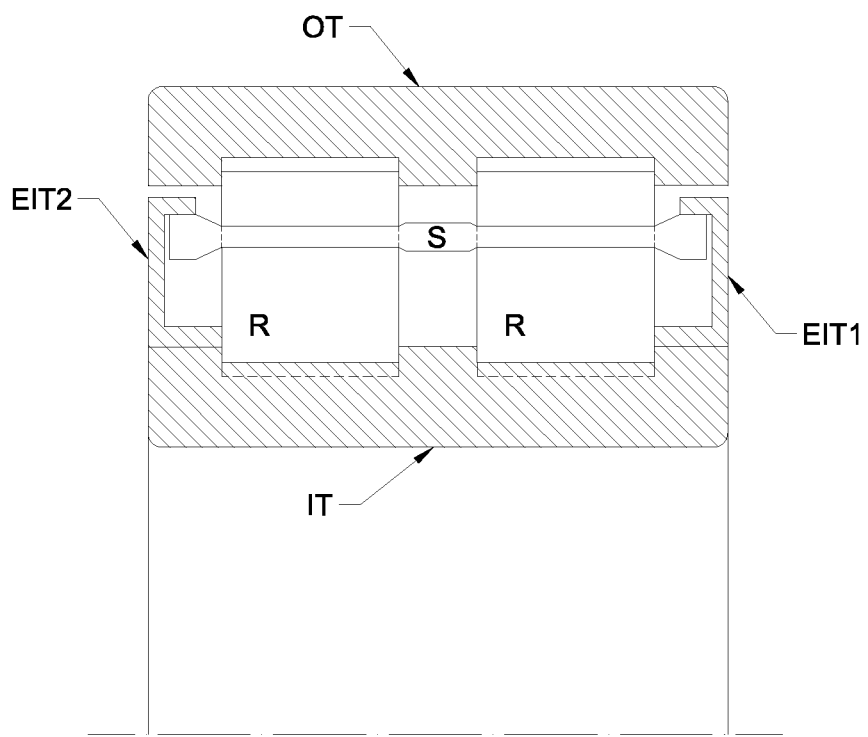
FIGS. 23(a)-23(b) are fragmentary radial views in partial cross-section of the upper part of the radial bearing showing examples of use of the double cylindrical spacer S for the radial bearing with rolling members arranged in multiple rows, including multiple rows of rollers R in FIG. 23(a) and multiple rows of balls B in FIG. 23(b).
Figure 23:
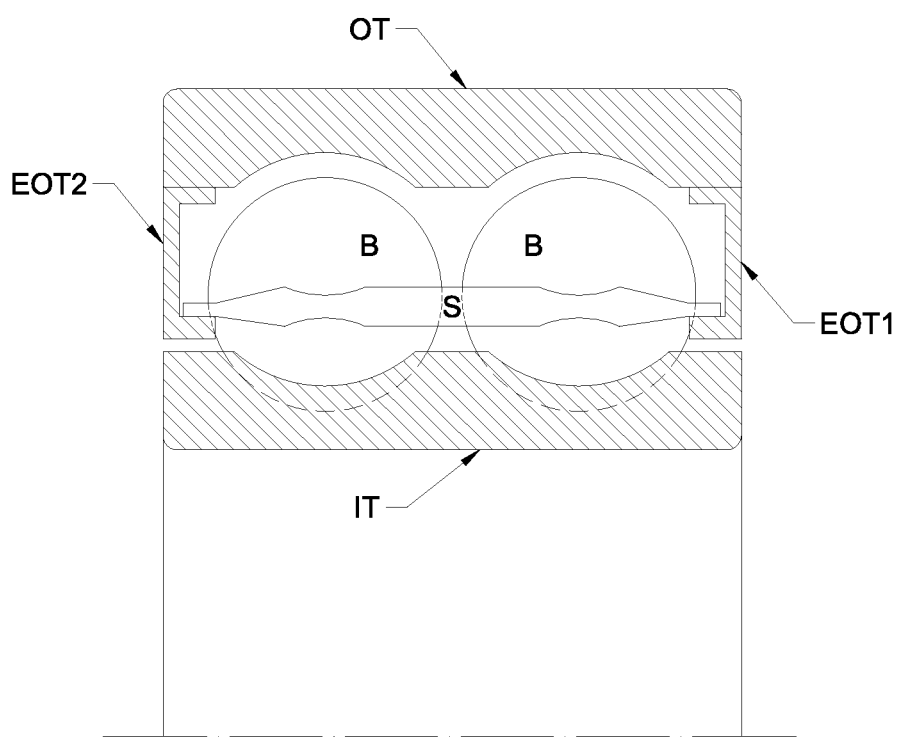

FIGS. 23(a)-23(b) are fragmentary radial views in partial cross-section of the upper part of the radial bearing showing examples of use of the double cylindrical spacer S for the radial bearing with rolling members arranged in multiple rows, including multiple rows of rollers R in FIG. 23(a) and multiple rows of balls B in FIG. 23(b).

Assembly of the radial bearing according to the present disclosure could be as follows: first, one of the extensions tracks is securely mounted to one of the inner and outer track edge, then all the rolling elements are assembled, all the separators are placed between the corresponding pair of rolling elements and finally the other extension track is securely mounted on the other end of the track.

The configurations of the spacers in the bearings according to the embodiments of the present disclosure allow for a maximum number of possible rolling elements to be incorporated in the bearings. As a result, maximum static and dynamic load capabilities as well as optimal load distributions are obtained.

The configurations of the bearings according to the embodiments of the present disclosure suitably accommodate configurations of rolling elements other than balls or rollers, such as kegs or barrels, as well as configurations with more than one row of rolling elements.

The spacers and extension elements of the bearings according to the embodiments of the present disclosure guarantee pure rolling contact among all the bearing components. Thus, the bearings according to the present disclosure are configured to operate with much less friction and wear than conventional ones fitted with cages. This in turn will allow an increase in the angular speed of running and the functional fatigue limit and, therefore, the useful life of these bearings.

The spacers of the bearings according to the embodiments of the present disclosure are very well supported and exhibit little slack or play. This allows them to support great forces and vibrations that are generated at high speeds.

The spacers of the bearings according to the embodiments of the present disclosure are easy and economical to manufacture.

The extension elements of the bearings according to the embodiments of the present disclosure provide a great obturation in the bearing which contains lubricant and prevent the penetration of dirt.

In the bearings according to the embodiments of the present disclosure, the individual spacers allow for a simple lubrication system to be provided. This is because friction due to sliding among the components of the bearings according to the embodiments of the present disclosure is substantially reduced, if not eliminated.

According to another feature of the bearings according to the embodiments of the present disclosure, all of the dimensions of components which are in common with related bearings with cages remain intact when the individual spacers and extension elements are incorporated. Therefore, the bearings according to the embodiments of the present disclosure comply with ISO standards (International Organization for Standardization) and DIM.

In view of the foregoing, it will be appreciated that the bearings of the present disclosure are formed with bearing components which move with pure rolling contact, i.e., without sliding contact among the bearing integral parts. The components include individual anti-friction separators which substantially improve the performance of the bearings and reduce the chances of failure. The individual anti-friction separators effectively eliminate friction and wear caused by conventional cages, obtain greater wear and fatigue functioning times, increase the operating speed ranges, boost the time and speed of operation, and increase capacities of static and dynamic load by occupying less space which makes it possible to arrange a larger number of rolling elements in the bearings and, therefore, raise the load capacities of the bearings. The bearings with anti-friction separators according to the present disclosure are also economical and easy to manufacture and assemble.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but are to be accorded the widest scope consistent with the principles and novel features disclosed herein.

What is claimed is:

1. An anti-friction radial bearing comprising:
   an inner track;
   an outer track;
   two extensions members securely mounted to one of the inner and outer tracks, each of the two extensions members having an internal cylindrical hoop surface whose axis of symmetry coincides with the axis of symmetry of the radial bearing;
   a plurality of equidistantly spaced load-carrying rolling members rotatably engageable with e inner and outer tracks; and
   a plurality of individual spacers each separating two adjacent ones of the plurality of rolling members, each of the individual spacers being formed of (a) two end portions each provided with a cylindrical part having a diameter DE and (b) a central portion having a diameter DC, the central and end portions of each individual spacer extending along the same axis of symmetry;
   wherein displacement of the plurality of individual spacers in their axial direction is prevented by (a) the two extensions members or (b) simultaneously by both the rolling members and the two extensions members; and
   wherein the plurality of rolling members and the inner and outer tracks, the central portion of each of the plurality of individual spacers and the two adjacent rolling members that it separates, and the two end portions of each of the plurality of individual spacers and both internal cylindrical hoop surfaces of the two extension members undergo only pure rolling contact such that there is no friction, wear and heat generation in the entire radial bearing.

2. The anti-friction friction radial bearing of claim 1, wherein:
   the internal cylindrical hoop surface of each of the two extensions members has a corresponding radius REIT for the inner track and radius REOT for the outer track and their axes of symmetry coincide with the axis of symmetry of the radial bearing;
   when the two extensions members are securely mounted to the inner track, the diameters DC and DE of the individual spacers and the radius REIT for the inner track are interdependent with one another such that one of these dimensions determines the corresponding other two of these dimensions; and
   when the two extensions members are securely mounted to the outer track, the diameters DC, DE of the individual spacers and the radius REOT for the outer track are interdependent with one another such that one of these dimensions determines the other two of these dimensions.

3. The anti-friction radial bearing of claim 1, wherein:
when the two extensions members are securely mounted to the inner track, the diameters DC and DE of the individual spacers are defined by the mean radius of the radial bearing, the number of rolling members, the radius of the center of the rolling members and the radius of the internal cylindrical hoop surface of the two inner track extensions members; and
when the two extensions members are securely mounted to the outer track, the diameters DC and DE of the individual spacers are defined by the mean radius of the radial bearing, the number of rolling members, the radius of the center of the rolling members and the radius of the internal cylindrical hoop surface of the two outer track extensions members.

4. The anti-friction radial bearing of claim 1, wherein:
when the two extensions members are securely mounted to the inner track, for each of the plurality of individual spacers the diameter DC is less than the diameter DE; and
when the two extensions members are securely mounted to the outer track, for each of the plurality of individual spacer the diameter DC is greater than the diameter DE.

5. The anti-friction radial bearing of claim 1, wherein the rolling members are arranged in multiple rows.

6. An anti-friction radial bearing comprising:
an inner track;
an outer track;
two extensions members securely mounted to the inner track, each of the two extension members having an internal cylindrical hoop surface whose axis of symmetry coincides with the axis of symmetry of the radial bearing;
a plurality of equidistantly spaced load-carrying rolling members rotatably engageable with the inner and outer tracks; and
a plurality of individual spacers each separating two adjacent ones of the plurality of rolling members, each of the individual spacers being formed of (a) two end portions each provided with a cylindrical part having a diameter DE and (b) a central portion having a diameter DC smaller than the diameter DE, the central and end portions of each individual spacer extending along the same axis of symmetry;
wherein displacement of the plurality of individual spacers in their axial direction is prevented by (a) the two extensions members or (b) simultaneously by both the rolling members and the two extensions members; and
wherein the plurality of rolling members and the inner and outer tracks, the central portion of each of the plurality of individual spacers and the two adjacent rolling members that it separates, and the two end portions of each of the plurality of individual spacers and both internal cylindrical hoop surfaces of the two extensions members undergo only pure rolling contact such that there is not friction, wear and heat generation in the entire radial bearing.

7. The anti-friction radial bearing of claim 6, wherein the rolling members comprise one of balls, rollers and keg- or barrel-shaped rolling members.

8. The anti-friction radial bearing of claim 6, wherein:
the rolling members comprise balls;
in the case where displacement of the plurality of individual spacers in their axial direction is prevented by the two extension members, each of the plurality of individual spacers has a conical portion extending between the central portion and the cylindrical part of each corresponding end portion, with each conical portion increasing in diameter from the cylindrical part of each corresponding end portion toward the central portion; and
in the case where displacement of the plurality of individual spacers in their axial direction is prevented simultaneously by both the balls and the two extensions members, (a) each of the plurality of individual spacers has a conical portion extending between the central portion and the cylindrical part of each corresponding end portion, with each conical portion increasing in diameter from the cylindrical part of each corresponding end portion toward the central portion, and (b) the central portion of each of the plurality of individual spacers is provided with a groove.

9. The anti-friction radial bearing of claim 6, wherein:
the rolling members comprise keg- or barrel-shaped rolling members;
in the case where displacement of the plurality of individual spacers in their axial direction is prevented by the two extension members, each of the plurality of individual spacers has a conical portion extending between the central portion and the cylindrical part of each corresponding end portion, with each conical portion increasing in diameter from the cylindrical part of each corresponding end portion toward the central portion; and
in the case where displacement of the plurality of individual spacers in their axial direction is prevented simultaneously by both the keg- or barrel-shaped rolling members and the two extensions members, (a) each of the plurality of individual spacers has a conical portion extending between the central portion and the cylindrical part of each corresponding end portion, with each conical portion increasing in diameter from the cylindrical part of each corresponding end portion toward the central portion, and (b) the central portion of each of the plurality of individual spacers is provided with a groove.

10. An anti-friction radial bearing comprising:
an inner track;
an outer track;
two extensions members securely mounted to the outer track, each of the two extension members having an internal cylindrical hoop surface whose axis of symmetry coincides with the axis of symmetry of the radial bearing;
a plurality of equidistantly spaced load-carrying rolling members rotatably engageable with the inner and outer track;
a plurality of individual spacers each separating two adjacent ones of the plurality of rolling members, each of the individual spacers being formed of two end portions having a diameter DE and a central portion having a diameter DC greater than the diameter DE, the central and end portions of each individual spacer extending along the same axis of symmetry;
wherein displacement of the plurality of individual spacers in their axial direction is prevented by (a) the rolling members, (b) the two extensions members, or (c) simultaneously by both the rolling members and the two extensions members; and
wherein the plurality of rolling members and the inner and outer tracks, the central portion of each of the plurality of individual spacers and the two adjacent rolling members that it separates, and the two end portions of each of the plurality of individual spacers and both internal cylindrical hoop surfaces of the two extensions members undergo only pure rolling contact such that there is not friction, wear and heat generation in the entire radial bearing.

11. The anti-friction radial bearing of claim 10, wherein the rolling members comprise one of balls, rollers or keg- or barrel-shaped rolling members.

12. The anti-friction radial bearing of claim 10, wherein:
the rolling members comprise balls;
in the case where displacement of the plurality of individual spacers in their axial direction is prevented by the balls, the central portion of each of the plurality of individual spacers is provided with a groove;
in the case where displacement of the plurality of individual spacers in their axial direction is prevented by the two extension members, each of the plurality of individual spacers has a conical portion extending between the central portion and the cylindrical part of each corresponding end portion, with each conical portion increasing in diameter from the cylindrical part of each corresponding end portion toward the central portion; and
in the case where displacement of the plurality of individual spacers in their axial direction is prevented simultaneously by both the balls and the two extensions members, (a) each of the plurality of individual spacers has a conical portion extending between the central portion and the cylindrical part of each corresponding end portion, with each conical portion increasing in diameter from the cylindrical part of each corresponding end portion toward the central portion, and (b) the central portion of each of the plurality of individual spacers is provided with a groove.

13. The anti-friction radial bearing of claim 10, wherein the rolling members comprise rollers; and wherein in the case where displacement of the plurality of individual spacers in their axial direction is prevented by the two extension members, each of the plurality of individual spacers has a conical portion extending between the central portion and the cylindrical part of each corresponding end portion, with each conical portion increasing in diameter from the cylindrical part of each corresponding end portion toward the central portion.

14. The anti-friction radial bearing of claim 10, wherein:
the rolling members comprise keg- or barrel-shaped rolling members;
in the case where displacement of the plurality of individual spacers in their axial direction is prevented by the keg- or barrel-shaped rolling members, the central portion of each of the plurality of individual spacers is provided with a groove;
in the case where displacement of the plurality of individual spacers in their axial direction is prevented by the two extension members, each of the plurality of individual spacers has a conical portion extending between the central portion and the cylindrical part of each corresponding end portion, with each conical portion increasing in diameter from the cylindrical part of each corresponding end portion toward the central portion; and
in the case where displacement of the plurality of individual spacers in their axial direction is prevented simultaneously by both the keg- or barrel-shaped rolling members and the two extensions members, (a) each of the plurality of individual spacers has a conical portion extending between the central portion and the cylindrical part of each corresponding end portion, with each conical portion increasing in diameter from the cylindrical part of each corresponding end portion toward the central portion, and (b) the central portion of each of the plurality of individual spacers is provided with a groove.

15. An anti-friction radial bearing comprising:
an inner track;
an outer track;
two extensions members securely mounted to the inner track, each of the two extension members having an internal cylindrical hoop surface whose axis of symmetry coincides with the axis of symmetry of the radial bearing;
a plurality of equidistantly spaced rollers rotatably engageable with the inner and outer tracks; and
a plurality of individual spacers each separating two adjacent ones of the plurality of rollers, each of the individual spacers being formed of two end portions each having a cylindrical part with a diameter DE, a central portion having a diameter DC smaller than the diameter DE, and a conical portion extending between the central portion and the cylindrical part of each corresponding end portion, each conical portion decreasing in diameter from the cylindrical part of each corresponding end portion toward the central portion, and for each of the plurality of individual spacers the end portions, central portion and conical portions all extend along the same axis of symmetry;
wherein displacement of the plurality of individual spacers in their axial direction is prevented by the rollers; and
wherein the rollers and the inner and outer tracks, the central portion of each of the plurality of individual spacers and the two adjacent rollers that it separates, and the two end portions of each of the plurality of individual spacers and both internal cylindrical hoop surfaces of the two extensions members undergo only pure rolling contact such that, there is not friction, wear and heat generation in the entire radial bearing.

16. An anti-friction radial bearing comprising:
an inner track;
an outer track;
two extensions members securely mounted to the inner track, each of the two extension members having an internal cylindrical hoop surface whose axis of symmetry coincides with the axis of symmetry of the radial bearing;
a plurality of equidistantly spaced keg- or barrel-shaped rolling members rotatably engageable with the inner and outer tracks; and
a plurality of individual spacers each separating two adjacent ones of the plurality of keg- or barrel-shaped rolling members, each of the individual spacers being formed of two end portions and a central portion extending along the same axis of symmetry, the central portion having a groove with a cylindrical part having a diameter DC, and each of the two end portions being provided with a cylindrical part having a diameter DE greater than the diameter DC;
wherein displacement of the plurality of individual spacers in their axial direction is prevented by the keg- or barrel-shaped rolling members; and
wherein the keg- or barrel-shaped rolling members and the inner and outer tracks, the central portion of each of the plurality of individual spacers and the two adjacent keg- or barrel-shaped rolling members that it separates, and the two end portions of each of the plurality of individual spacers and both internal cylindrical hoop surfaces of the two extensions members undergo only pure rolling contact such that there is not friction, wear and heat generation in the entire radial bearing.

\* \* \* \* \*